(12) United States Patent
Kaufthal et al.

(10) Patent No.: US 10,042,655 B2
(45) Date of Patent: Aug. 7, 2018

(54) ADAPTABLE USER INTERFACE DISPLAY

(71) Applicant: Microsoft Technology Licensing, LLC, Redmond, WA (US)

(72) Inventors: Jonathan S. Kaufthal, Seattle, WA (US); Charles Scott Walker, Sammamish, WA (US); Travis Spomer, Redmond, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 214 days.

(21) Appl. No.: 14/755,590

(22) Filed: Jun. 30, 2015

(65) Prior Publication Data

US 2016/0209994 A1    Jul. 21, 2016

Related U.S. Application Data

(60) Provisional application No. 62/105,777, filed on Jan. 21, 2015.

(51) Int. Cl.
| | |
|---|---|
| *G06F 9/451* | (2018.01) |
| *G06F 9/44* | (2018.01) |
| *G06F 9/455* | (2018.01) |
| *G06F 8/38* | (2018.01) |

(52) U.S. Cl.
CPC .............. *G06F 9/451* (2018.02); *G06F 8/38* (2013.01); *G06F 9/45512* (2013.01)

(58) Field of Classification Search
CPC ...... G06F 9/4443; G06F 9/45512; G06F 8/38; G06F 9/451

USPC ......................................................... 715/746
See application file for complete search history.

(56) References Cited

U.S. PATENT DOCUMENTS

| | | |
|---|---|---|
| 5,060,170 A | 10/1991 | Bourgeois et al. |
| 5,142,618 A | 8/1992 | Fujiwara et al. |
| 5,390,295 A | 2/1995 | Bates et al. |
| 5,408,602 A | 4/1995 | Giokas et al. |
| 5,712,995 A | 1/1998 | Cohn |

(Continued)

FOREIGN PATENT DOCUMENTS

| | | |
|---|---|---|
| EP | 955580 A1 | 11/1999 |
| EP | 820002 A1 | 10/2002 |

(Continued)

OTHER PUBLICATIONS

PCT Second Written Opinion Issued in PCT Application No. PCT/US2016/014201, dated Dec. 14, 2016, 4 Pages.

(Continued)

*Primary Examiner* — John Repsher, III
(74) *Attorney, Agent, or Firm* — Merchant & Gould P.C.

(57) ABSTRACT

Aspects of a system for automatically adapting an application user interface display on a small form factor computing device include a computing device having at least a processing device, a memory, and a display. The user interface is a functional landscape of an application that accommodates and displays, in various combinations, multiple regions of application functional controls and information. An adaptive user interface display module detects a change in available screen space for the application user interface on a small form factor computing device, and adjusts the functional landscape accordingly.

14 Claims, 18 Drawing Sheets

(56) References Cited

U.S. PATENT DOCUMENTS

| | | |
|---|---|---|
| 5,726,669 A | 3/1998 | Obata |
| 5,757,371 A | 5/1998 | Oran et al. |
| 5,825,360 A | 10/1998 | Odam |
| 5,999,177 A | 12/1999 | Martinez et al. |
| 6,356,279 B1 | 3/2002 | Halstead, Jr. et al. |
| 6,414,698 B1 | 7/2002 | Lovell |
| 6,603,493 B1 | 8/2003 | Lovell |
| 7,080,326 B2 | 7/2006 | Molander et al. |
| 7,496,844 B2 | 2/2009 | Andrew |
| 7,577,922 B2 | 8/2009 | Mann |
| 7,620,908 B2 | 11/2009 | Klevenz et al. |
| 7,681,143 B2 | 3/2010 | Lindsay et al. |
| 7,692,658 B2 | 4/2010 | Moore |
| 7,730,422 B2 | 6/2010 | Russo |
| 7,873,622 B1 | 1/2011 | Karls et al. |
| 8,245,143 B2 | 8/2012 | Yach et al. |
| 8,341,143 B1 | 12/2012 | Karls et al. |
| 8,381,127 B2 | 2/2013 | Singh et al. |
| 8,464,177 B2 | 6/2013 | Ben-Yoseph et al. |
| 8,484,574 B2 | 7/2013 | Burroughs et al. |
| 8,490,014 B2 | 7/2013 | Colussi et al. |
| 8,527,907 B2 | 9/2013 | Goshey |
| 8,543,904 B1 | 9/2013 | Karls et al. |
| 8,635,553 B2 | 1/2014 | Dhawan |
| 8,705,119 B2 | 4/2014 | Bonikowski et al. |
| 8,736,561 B2 | 5/2014 | Anzures et al. |
| 8,930,845 B2 | 1/2015 | Ma et al. |
| 9,026,928 B2 | 5/2015 | Ferry et al. |
| 9,223,591 B2 | 12/2015 | Hayes et al. |
| 9,411,487 B2 | 8/2016 | Ording |
| 9,513,783 B1* | 12/2016 | Vaidya .................. G06F 9/4443 |
| 2002/0089546 A1 | 7/2002 | Kanevsky et al. |
| 2002/0191028 A1 | 12/2002 | Senechalle et al. |
| 2003/0025737 A1 | 2/2003 | Breinberg |
| 2003/0137539 A1 | 7/2003 | Dees |
| 2004/0189710 A1 | 9/2004 | Goulden et al. |
| 2004/0268212 A1 | 12/2004 | Malik |
| 2004/0268269 A1 | 12/2004 | Breinberg |
| 2005/0005236 A1 | 1/2005 | Brown et al. |
| 2005/0114788 A1 | 5/2005 | Fabritius |
| 2005/0183017 A1 | 8/2005 | Cain |
| 2005/0188174 A1 | 8/2005 | Guzak et al. |
| 2006/0236264 A1 | 10/2006 | Cain et al. |
| 2007/0016875 A1 | 1/2007 | Santos-Gomez |
| 2007/0022389 A1 | 1/2007 | Ording et al. |
| 2007/0168859 A1 | 7/2007 | Fortes |
| 2007/0180401 A1 | 8/2007 | Singh et al. |
| 2007/0250788 A1 | 10/2007 | Rigolet |
| 2007/0288431 A1 | 12/2007 | Reitter |
| 2008/0052637 A1 | 2/2008 | Ben-Yoseph et al. |
| 2008/0094368 A1 | 4/2008 | Ording et al. |
| 2008/0120569 A1 | 5/2008 | Mann et al. |
| 2008/0204417 A1 | 8/2008 | Pierce et al. |
| 2009/0171920 A1 | 7/2009 | Wade et al. |
| 2009/0196414 A1 | 8/2009 | Mittal et al. |
| 2009/0300542 A1* | 12/2009 | Duarte .................. G06F 3/0481 715/800 |
| 2010/0019989 A1 | 1/2010 | Odagawa et al. |
| 2010/0046013 A1 | 2/2010 | Bonikowski et al. |
| 2010/0058220 A1 | 3/2010 | Carpenter |
| 2010/0070876 A1 | 3/2010 | Jain |
| 2010/0138767 A1 | 6/2010 | Wang et al. |
| 2010/0229110 A1 | 9/2010 | Rockey et al. |
| 2011/0252304 A1* | 10/2011 | Lemonik ............. G06F 17/2247 715/234 |
| 2011/0260970 A1* | 10/2011 | Kuo .................. G06F 3/0488 345/161 |
| 2012/0001914 A1* | 1/2012 | Pan .................. G06Q 30/0241 345/428 |
| 2012/0081317 A1 | 4/2012 | Sirpal |
| 2012/0096344 A1* | 4/2012 | Ho .................. G06F 17/211 715/249 |
| 2012/0166989 A1 | 6/2012 | Brown et al. |
| 2012/0200586 A1* | 8/2012 | Lima .................. G06F 3/0481 345/582 |
| 2013/0014050 A1 | 1/2013 | Queru |
| 2013/0019183 A1* | 1/2013 | Reeves ............. G06F 9/4443 715/745 |
| 2013/0047118 A1 | 2/2013 | Hooper et al. |
| 2013/0125050 A1 | 5/2013 | Goshey |
| 2013/0132885 A1 | 5/2013 | Maynard et al. |
| 2013/0151996 A1* | 6/2013 | Nario .................. H04W 4/003 715/760 |
| 2013/0159941 A1* | 6/2013 | Langlois ............ G06F 3/017 715/863 |
| 2014/0033118 A1 | 1/2014 | Baird |
| 2014/0040819 A1 | 2/2014 | Duffy |
| 2014/0068505 A1 | 3/2014 | Hayes et al. |
| 2014/0168277 A1 | 6/2014 | Ashley et al. |
| 2014/0258924 A1 | 9/2014 | Sekino |
| 2014/0282232 A1 | 9/2014 | Oh |
| 2014/0344750 A1 | 11/2014 | Takahashi et al. |
| 2015/0212723 A1 | 7/2015 | Lim et al. |
| 2015/0286344 A1 | 10/2015 | Kaufthal et al. |
| 2016/0085387 A1 | 3/2016 | Hayes et al. |
| 2016/0170622 A1 | 6/2016 | Ladd et al. |
| 2016/0209987 A1 | 7/2016 | Kaufthal et al. |

FOREIGN PATENT DOCUMENTS

| | | |
|---|---|---|
| WO | 0109834 A1 | 2/2001 |
| WO | 02082418 A2 | 10/2002 |
| WO | 2006030002 A1 | 3/2006 |
| WO | 2008030879 A2 | 3/2008 |

OTHER PUBLICATIONS

PCT International Preliminary report Issued in PCT Application No. PCT/US2016/014201, dated Mar. 14, 2017, 7 Pages.

Office Action dated Dec. 27, 2016 in U.S. Appl. No. 14/453,445, 49 pages.

Amir Khella et al: "Pocket PhotoMesa: A Zoomable Image Browser for PDAs", International Conference on Mobile and Ubiquitous Multimedia, ACM, US, Oct. 29, 2004 (Oct. 29, 2004), pp. 1-6, XP002462595.

Create Multiple Panes in a Mobile Application, Published on: Jan. 19, 2012 Available at: http://help.adobe.com/en_US/flex/mobileapps/WSa367498dc1175407-5e4576591324aa78a9f-8000.html.

Lars Erik Holmquist: "The Zoom Browser Showing Simultaneous Detail and Overview in Large Documents", Internet Citation, 1998, XP002462982, Retrieved from the Internet: URL:http://www.hb.se/bhs/ith/3-98/leh.htm [retrieved on Dec. 17, 2007].

Microsoft Office 2010, Retrieved at <<https://en.wikipedia.org/w/index.php?title=Microsoft_Office_2010&oldid=601512204>> Mar. 27, 2014, 12 Pages.

Mitrovic, et al., "Adaptive User Interfaces based on Mobile Agents: Monitoring the Behavior of users in a Wireless Environment", In First Symposium on Ubiquitous Computing and Ambient Intelligence, Sep. 2005, 8 pages.

Natasa Milic-Frayling et al: "SmartView: Enhanced Document Viewer for Mobile Devices", Internet Citation, Nov. 15, 2002 (Nov. 15, 2002), XP002462835, Retrieved from the Internet: URL:ftp://ftp.research.microsoftcom/pub/tr/tr-2002-114.pdf [retrieved on Dec. 17, 2007].

Patrick Baudisch et al: "Collapse-to-zoom Viewing Web Pages on Small Screen Devices by Interactively Removing Irrelevant Content", UIST 04. Proceedings of the 17th. Annual ACM Symposium on User Interface Software and Technology. Santa Fe, NM, Oct. 24-27, 2004; [ACM Symposium on User Interface Software and Technology. New York, NY : ACM Press, US, Oct. 24, 2004 (Oct. 24, 2004), pp. 1-4, XP002462837. ISBN: 978-1-58113-957-0.

PCT International Preliminary Report on Patentability Issued in PCT Application No. PCT/US2015/022894, dated Jun. 16, 2016, 15 Pages.

PCT International Search Report and Written Opinion for Application PCT/US2016/014201, dated Apr. 26, 2016, 12 pages.

(56) References Cited

OTHER PUBLICATIONS

PCT International Search Report and Written Opinion Issued in PCT Patent Application No. PCT/US2015/022894, dated Jun. 25, 2015, 10 Pages.
PCT Second Written Opinion Issued in PCT Application No. PCT/US2015/022894, dated Feb. 17, 2016, 6 Pages.
U.S. Appl. No. 14/453,445 Office Action dated Jul. 15, 2016, 45 pages.
"LG G2 Review: Beautiful Monster", Published on: Sep. 7, 2013 Available at: http://www.gsmarena.com/lg_g2-review-982p7.php.
"Samsung note 1 Internet Snapshots taken from Samsung note 1 Internet Platform: Android", Published on: Feb. 14, 2014 Available at: http://allaboutgalaxynote.com/wp-content/uploads/2013/09/Galaxy_Note_User_Manual_GT-N7000_Jellybean_EU_English_20130124.pdf.
Echessa, Joyce, "Building Adaptive User Interfaces for iOS 8", Published on: Nov. 6, 2014 Available at: http://www.sitepoint.com/building-adaptive-user-interfaces-ios-8/.
Itzkovitch, Avi, "Designing for Device Orientation: From Portrait to Landscape", Published on: Aug. 10, 2012 Available at: http://www.smashingmagazine.com/2012/08/10/designing-device-orientation-portrait-landscape/.
"API Guides", Best Practices | Supporting Multiple Screens | Android Developers, Published on: Jul. 8, 2012 Available at: http://developer.android.com/guide/practices/screens_support.html.
"Qt Project", Published on: Jan. 27, 2015 Available at: http://qt-project.org/doc/qt-4.8/widgets-orientation.html.
Yadav, at el., "Android OS Exploits: The Robust", In International Journal of Innovative Research in Technology, vol. 1, Issue 6, Nov. 2014, pp. 1537-1543.
Holzinger, at el., "Making Apps Useable on Multiple Different Mobile Platforms: On Interoperability for Business Application Development on Smartphones", In Proceedings of International Cross-Domain Conference and Workshop on Availability, Reliability, and Security, Aug. 20, 2012, 3 pages.
Sacco, Al, "BlackBerry Passport Productivity Tips, Tricks and Keyboard Shortcuts", Published on: Oct. 8, 2014 Available at: http://www.cio.com/article/2691208/blackberry-phone/blackberry-passport-productivity-tips-tricks-and-keyboard-shortcuts.html.
"API Guides", App Manifest | <activity> | Android Developers, Published on: Jul. 8, 2012 Available at: http://developer.android.com/guide/topics/manifest/activity-element.html.
U.S. Appl. No. 14/755,794, Office Action dated Jul. 17, 2017, 23 pages.
U.S. Appl. No. 14/453,445, Office Action dated Nov. 16, 2017, 49 pages.
U.S. Appl. No. 14/755,794, Office Action dated Jan. 2, 2018, 24 pages.
"Final Office Action Issued in U.S. Appl. No. 14/453,445", dated Apr. 30, 2018, 33 Pages.
"Non-Final Office Action Issued in U.S. Appl. No. 14/755,794", dated May 21, 2018, 25 Pages.

* cited by examiner

ADAPTABLE USER INTERFACE DISPLAY

CROSS REFERENCE TO RELATED APPLICATIONS

This application claims the benefit of U.S. Provisional Patent Application No. 62/105,777, titled "Adaptive User Interface Display" filed Jan. 21, 2015.

BACKGROUND

Computer and software users have grown accustomed to user-friendly software applications that help them write, calculate, organize, prepare presentations, send and receive electronic mail, make music, and the like. Users are increasingly using software applications on various types and size classes of computing devices, for example, small form factor computing devices, such as mobile phones, and large form factor computing devices, such as tablet computers, laptop computers, etc. To assist users to locate and utilize functionalities of a given software application and to access information associated with their content, one or more user interface elements containing a plurality of information regions and command controls is typically provided.

As the size of the computing device decreases, so too does the amount of screen space available for the display of functionalities, controls, commands, and information in the one or more user interface elements. Computing devices with constrained displays, such as devices having small effective resolutions and/or small screen sizes, may not be well suited for a same design and layout of user interface elements as computing devices with less-constrained displays.

It is with respect to these and other considerations that the present disclosure has been made. Although relatively specific problems have been discussed, it should be understood that the examples disclosed herein should not be limited to solving the specific problems identified in the background.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Aspects of an adaptable user interface display system and method automatically adapt a user interface for display and scaling of selectable controls, commands, and information within at least one user interface element to accommodate different device sizes or a change in screen size of a computing device having at least a processing device, a memory, and a display. The user interface includes software-controlled visual elements displayed on the display that allow a user to interact with the device, for example, on-screen buttons, menus, icons, text entry boxes, informational regions, etc. In some examples, the user interface is a functional landscape of an application that accommodates and displays, in various combinations, multiple regions of application functional controls and information. An adaptive user interface display module detects a change in available screen space for a user interface on a small form factor computing device, and adjusts the functional landscape accordingly. According to an aspect the adaptive user interface display module customizes the user interface to provide a visually and functionally optimized user interface for a small form factor computing device.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views.

DETAILED DESCRIPTION

Various aspects are described more fully below with reference to the accompanying drawings, which form a part hereof, and which show specific exemplary aspects. However, aspects may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Aspects of a system for automatically adapting a user interface display on a small form factor computing device are described herein and illustrated in the accompanying figures. Aspects of the disclosure are described in terms of a traditional user interface layout merely to provide a standard frame of reference; however, the disclosure is not limited to traditional user interface layouts. As such, usage of a particular orientation (e.g., horizontal, vertical, landscape, portrait, etc.), direction (e.g., left, right, up down), position (e.g., top, bottom, side, above, below, front, back, etc.), and dimension (e.g., height, width, etc.) should not be construed as limiting to that particular orientation, direction, position, or dimension.

Figure 1:
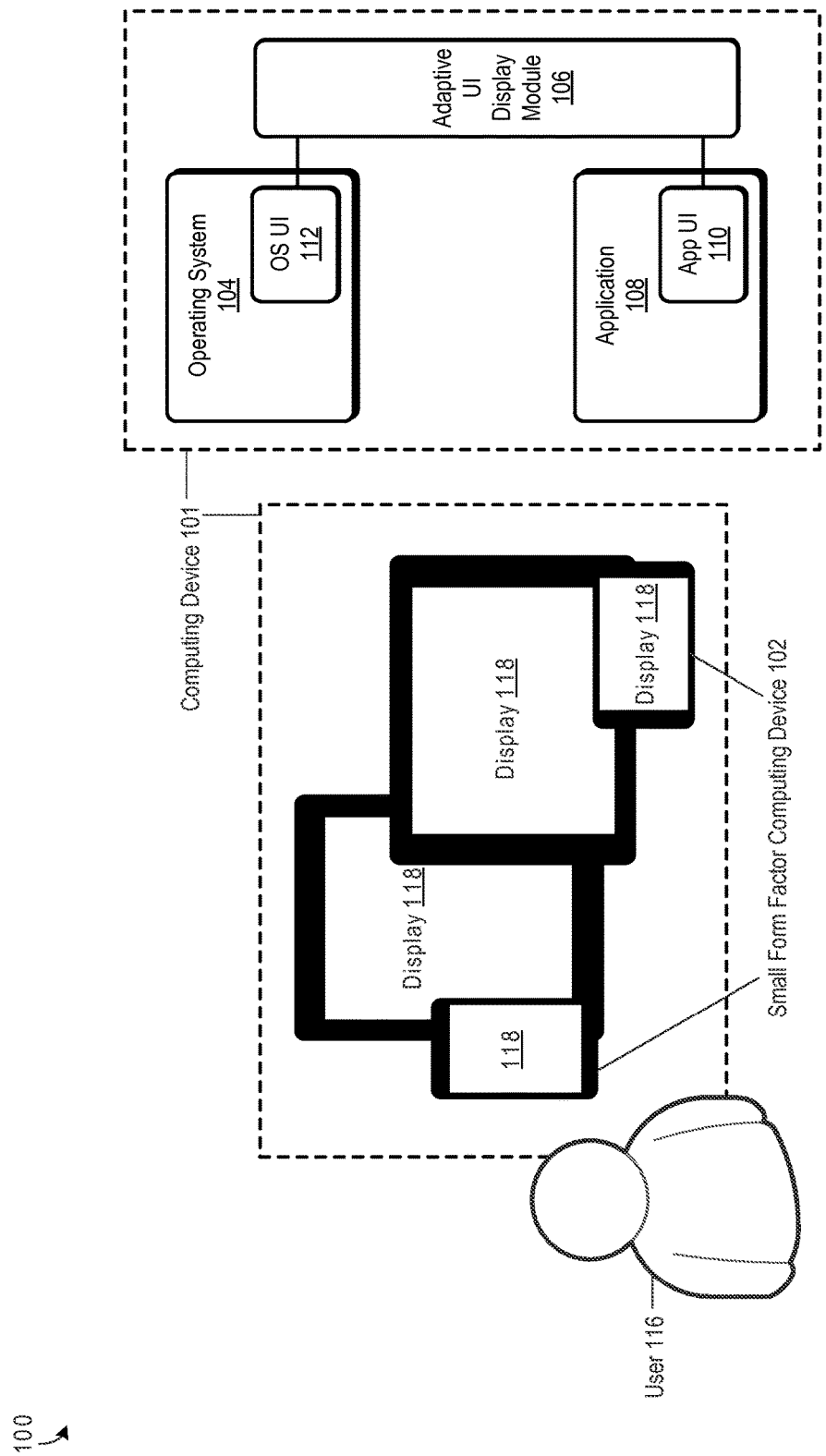
FIG. 1 is a simplified block diagram of an example adaptable user interface display system.

FIG. 1 is a block diagram of an example adaptive user interface display system. The system 100 includes an adaptive user interface (UI) display module 106 operable to configure a user interface 110 of an application 108 based on a type of computing device 101 on which the application 108 is being provided, for example, a small form factor computing device 102 (e.g., a wearable device, a smartphone, a smartphone-tablet hybrid device, etc.) or a large form factor computing device (e.g., a tablet device, a laptop device, a desktop device, a large screen device, etc.). While the small form factor computing device 102 is described as a collective class of smaller-sized computing device types, it should be appreciated that each smaller-sized computing device type (e.g., wearable device, smartphone, smartphone-tablet hybrid, etc.) may have its own separate device/size class. According to examples, in configuring the application UI 110 on a small form factor computing device 102, the adaptive UI display module 106 adjusts a visual display of one or more regions of application functionalities and information in accordance with the small form factor computing device 102. For example, in response to receiving an indication of an event that affects a layout of the application UI 110 (e.g., a selection to instantiate the application 108 on the computing device 101, a selection to instantiate a document, a change in the display configuration (e.g., orientation) of the device (e.g., caused by reorienting the display), a change in the mode and/or state of the application 108, user input, etc.), the adaptive UI display module 106 is operable to check the size of the display 118, and determine whether the device 101 is a small form factor computing device 102 or a large form factor computing device. In response to a determination that the device is a small form factor computing device 102, the adaptive UI display module 106 is further operable to check the dimensions of the display 118 and property information of the application 108 (e.g., a mode or state of the application 108, layout information, scaling information, etc.), and configure the application UI 110 in accordance with the display dimensions and property information.

The adaptive UI display module 106 is further operable to configure one or more regions of a user interface 112 of an operating system 104 of the device in accordance with property information provided by the application 108. According to an aspect, the one or more operating system UI regions provide functionalities and information for enabling interaction and communication between a user 116 and the operating system 104, for example, a system tray (sometimes referred to as a status bar) for displaying system-level status information (e.g., signal strength, battery life, date/time, an indication of the network over which wireless communication is occurring, etc.), and a system navigation region for displaying navigation functionalities (e.g., a back button, a start button, and a search button).

According to examples, the one or more regions of application functionalities and information which may be included in the UI 110 provide a functional landscape of the application 108 that accommodates and displays, in various combinations, various application elements, such as content, functional controls, and information. The application UI 110 may comprise a plurality of UI elements, for example, one or a combination of an application canvas for displaying application content (e.g., a document), an application title bar for displaying application and document related information, (e.g., a document title or page name, synchronization status, quick commands, etc.), a palette for displaying a plurality of commands related to changing a document's content, and a toolbar for displaying commands and document-related information. The adaptive UI display module 106 manages the display of the one or more UI elements and regions of functionalities and information according to configuration settings, for example, based on display properties of the device being used (e.g., small form factor computing device 102 versus a tablet, laptop computing device, desktop computing device, device orientation, etc.), information supplied by the application 108 (e.g., application-defined mode and state), and user interaction (e.g., selection of a command or functionality, selection to change the mode of the application 108, changing the orientation of the computing device 101, changing a size of an application window, etc.).

The adaptive UI display module 106, application UI 110, operating system UI 112 (sometimes referred to herein as system UI 112), and application 108 are executed on the computing device 101. According to examples, the computing device 101 may be one of various types of computing devices (e.g., a mobile communication device, an entertainment appliance, a wearable device, a tablet device, a personal computer, a gaming console, or other type of computing device) for executing applications 108 for performing a variety of tasks, for example, to write, calculate, draw, organize, prepare presentations, send and receive electronic mail, take and organize notes, make music, and the like. According to some examples, the application 108 comprises a multiple functionality software application for providing word processing functionality, slide presentation functionality, spreadsheet functionality, database functionality and the like. Some of the individual program modules comprising the multiple functionality application may include a word processing application, an electronic mail application, a slide presentation application, a spreadsheet application, and a database application. According to an aspect, the application 108 is a universal application that includes a single application and package that runs across various device types and sizes, and includes a shared code that provides for an adaptable user interface design.

According to an aspect, applications 108 include thick client applications stored locally on the computing device. According to another aspect, applications 108 include thin client applications (i.e., web applications) that reside on a remote server and are accessible over a network, such as the Internet or an intranet. According to an aspect, a thin client application is hosted in a browser-controlled environment or coded in a browser-supported language and reliant on a common web browser to render the application 108 executable on the computing device 101. The computing device 101 is configured to receive content for presentation on a display 118. According to an aspect, the display 118 is a touch screen display.

The application 108 is configured to enable a user 116 to use a pointing device (e.g., a pen/stylus, etc.) and/or to utilize sensors (e.g., touch sensor, gesture sensor, accelerometer, gyroscope, tilt sensor, etc.) on the computing device 101 to interact with content via a number of input modes. According to an aspect, the adaptive UI display module 106 automatically controls the display of the application UI 110 and the operating system UI 112 based in part on a display 118 size provided by the operating system 104 to provide a UI that is visually and functionally optimized for the computing device 101. For example, based on a determination that the size of the display 118 is within a threshold of a small form factor computing device 102 display size, the adaptive UI display module 106 follows a code path within the shared code that is specific to a small form factor computing device 102 that configures the application UI 110 and the operating system UI 112 such that it is adapted to the smaller display 118 of the small form factor computing device 102.

According to an aspect, automatically adapting a UI display on a small form factor computing device 102 increases computational efficiency and decreases an amount of time it takes to complete various tasks by providing a visually and functionally optimized UI 110 for a small form factor computing device 102. Further, computing resources are conserved by reducing a number of inputs that must be processed to perform tasks such as manually managing application functional controls and UI sizing.

An example method for providing an adaptive user interface, layout, and controls on a small form factor computing device 102 is described below. For ease of description of steps of the example method, a description of UI elements and regions is provided first. The application UI 110 includes a frame that defines the outer perimeter of a window displaying the application 108. Within the frame, the application UI 110 further includes at least one application canvas, where application content, such as a document, is displayed and edited. Depending on the application-defined mode of the application UI 110 and based on a state of the application UI 110, the application UI 110 includes one or a combination of additional application UI elements, such as a title bar, an expanded palette or a collapsed hint state palette bar, and an expanded or hint state toolbar. Depending on the amount of space available within the frame and layout and scaling properties provided by the application 108, the layout of the one or more application UI elements and regions within the elements may be reconfigured and scaled. According to an aspect, depending on the application-defined mode of the application UI 110 and based on a state of the application UI 110, one or more elements of the system UI 112 may be displayed or reconfigured. For example and as will be described in more detail below, in certain application UI modes, a system tray or a system navigation region may be displayed, hidden, or displayed and responsively configured for display in the adaptive user interface.

Figure 2A:
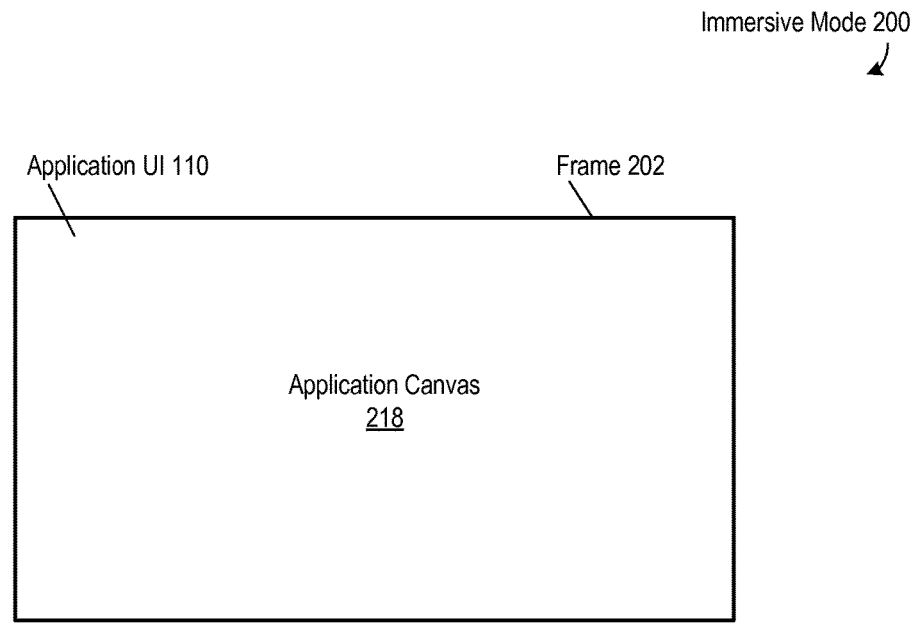
FIGS. 2A-C are illustrations showing various application UI elements in an example adaptable user interface display on a small form factor computing device when an application is in an immersive mode.
Figure 2B:
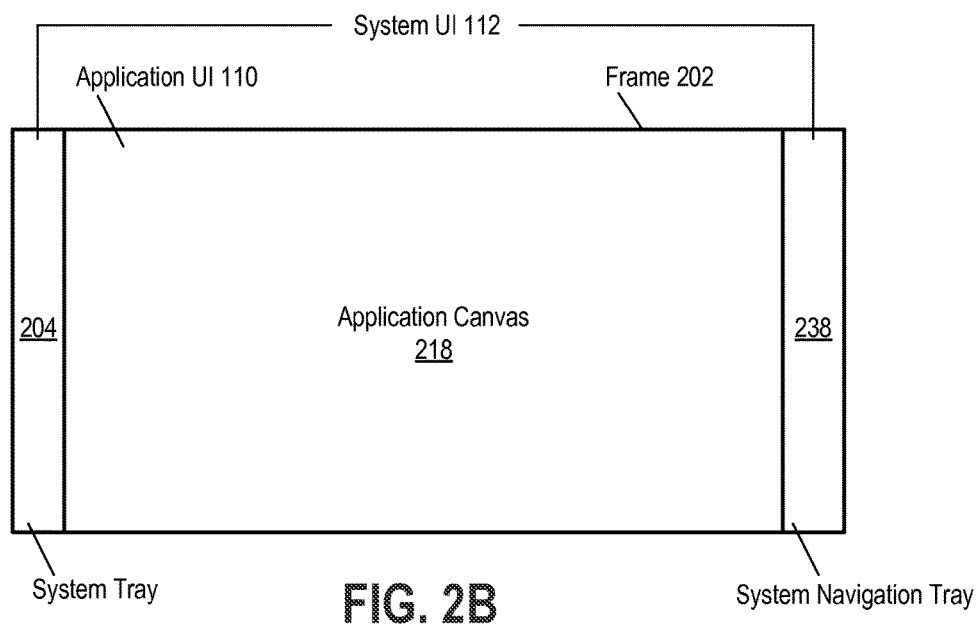
Figure 2C:
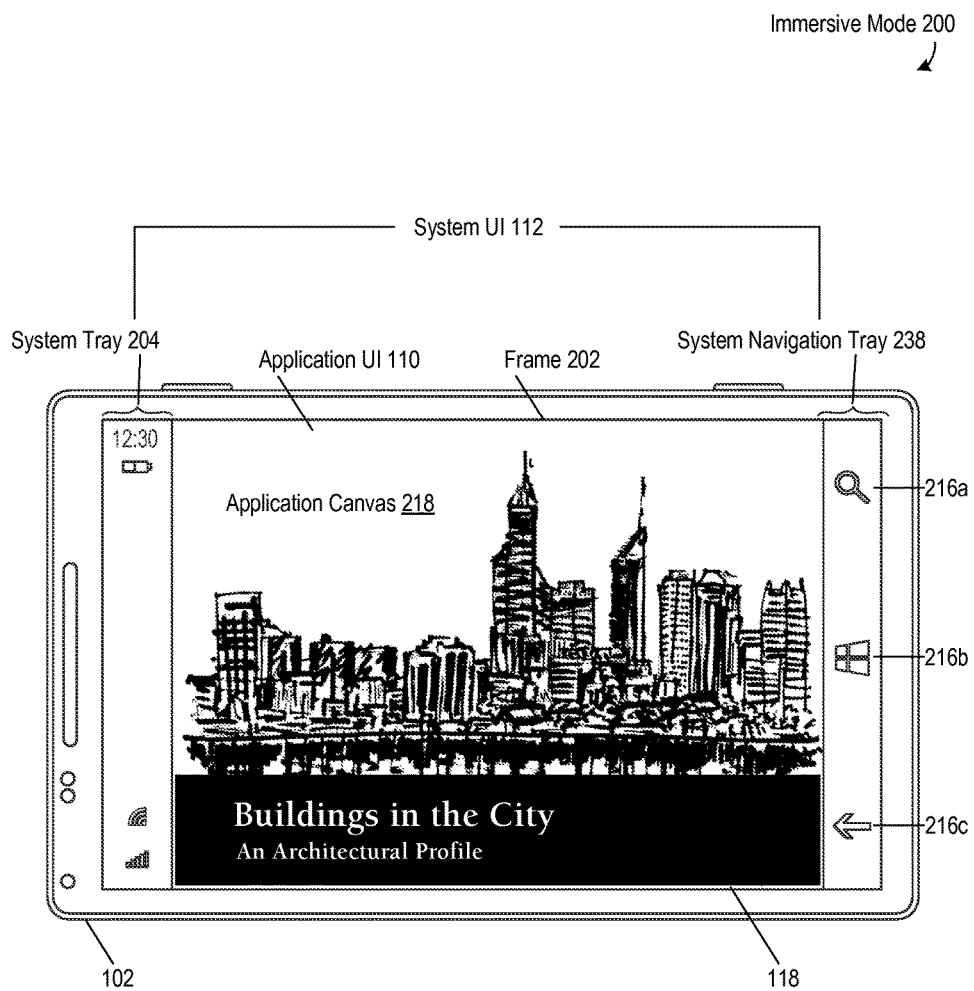

With reference now to FIG. 2A, in some examples, in an immersive mode 200, such as a slideshow mode in a slide presentation application 108 or a read mode in a word processing application 108, the application UI 110 includes only the application canvas 218. Accordingly, in some examples, the application canvas 218 may fill the frame 202 of the application UI 110, for example, as illustrated in FIGS. 2A-C. In some examples and as illustrated in FIG. 2A, in the immersive mode 200, the application UI 110 fills the display 118 of the small form factor computing device 102. That is, in some examples, in the immersive mode 200, one or more system UI 112 elements may be removed from the display 118.

Figure 4A:
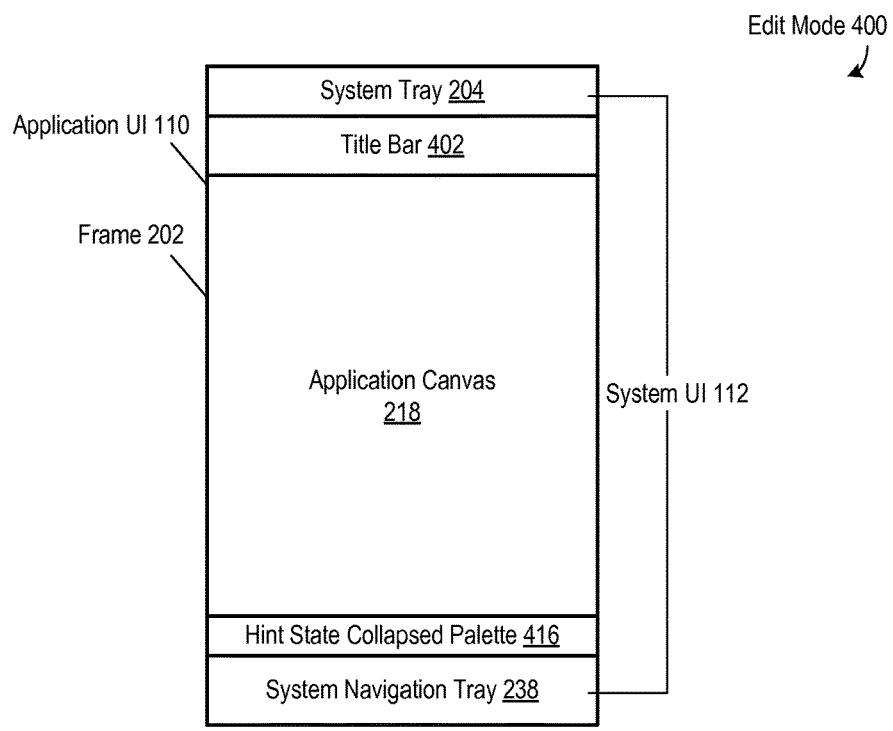
FIGS. 4A-H are illustrations showing various application UI elements in an example adaptable user interface display on a small form factor computing device when an application is in an edit mode.
Figure 4B:
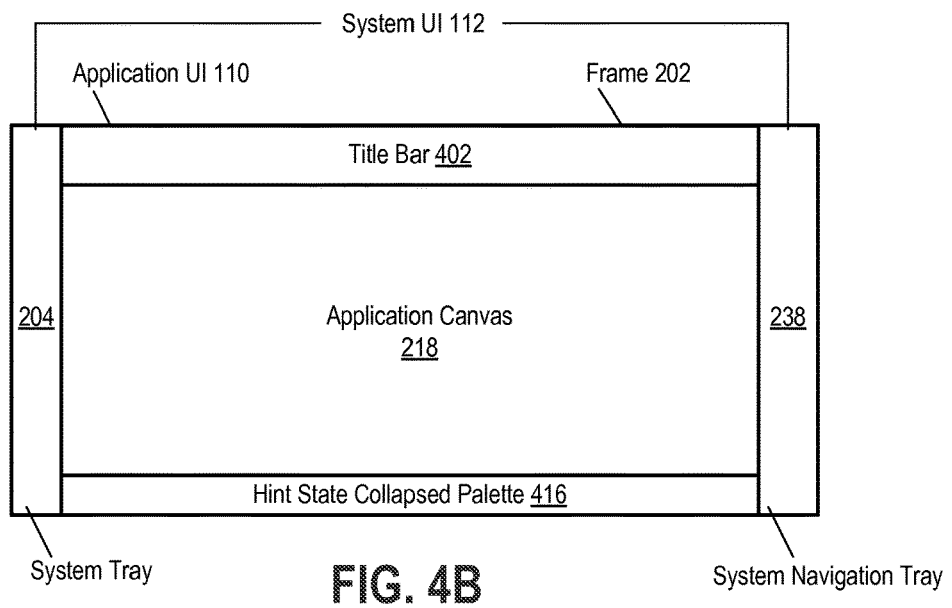

In other examples, and as illustrated in FIGS. 2B and 2C, in the immersive mode 200, the application UI 110 shares the display 118 with one or more system UI 112 elements, such as a system tray 204 and/or a system navigation region 238. According to examples, the system tray 204 includes a display of system-level status information, for example, network connectivity strength, signal strength, battery power, time, an indication of the network over which wireless communication is occurring, etc. According to an aspect, the adaptive UI display module 106 is operable to change the visibility, opacity, and background color of the system tray 204 based on instructions provided by the application 108. For example and as will be described in further detail with respect to FIGS. 4A, 4C, and 4D, the application 108 may provide information to the adaptive UI display module 106 to change the background color of the system tray 204 based on the type of application 108 (e.g., the color is dependent on the application type). According to an aspect, the location of the system tray 204, if displayed, is dependent on the orientation of the small form factor computing device 102. In some examples, the system tray 204 is located along the top edge of the display 118, for example, when the small form factor computing device 102 is in a portrait orientation. In other examples, such as when the small form factor computing device 102 is in a landscape orientation and as illustrated in FIGS. 2B and 2C, the system tray 204 is located along the side edge of the display 118. Status information items are arranged substantially in-line. For example, one or more status information items in the system tray 204 are displayed in a row or column (depending on the small form factor device 102 orientation), providing a compact region of information.

According to examples, the system navigation region 238 includes one or more on-screen OS navigation commands 216a-c (collectively, 216), such as a search button 216a, a start button 216b, and a back button 216c. According to an aspect, the location of the system navigation region 238, if displayed, is dependent on the orientation of the small form factor computing device 102. In some examples, the system navigation region 238 is located along the bottom edge of the display 118, such as when the small form factor computing device 102 is in a portrait orientation. In other examples, such as when the small form factor computing device 102 is in a landscape orientation and as illustrated in FIGS. 2B and 2C, the system navigation region 238 is located along the side edge of the display 118.

According to an aspect, the application 108 may be in the immersive mode 200 in response to a user-selection of a functionality associated with toggling the mode of the application 108. According to another aspect, the application 108 code may automatically toggle the mode to the immersive mode 200.

Figure 3A:
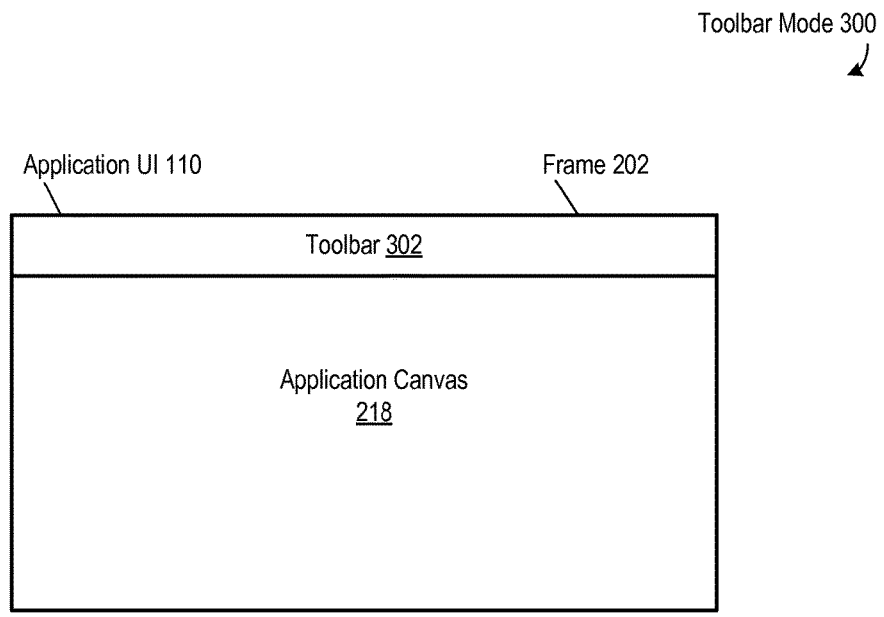
FIGS. 3A-C are illustrations showing various application UI elements in an example adaptable user interface display on a small form factor computing device when an application is in a toolbar mode.
Figure 3B:
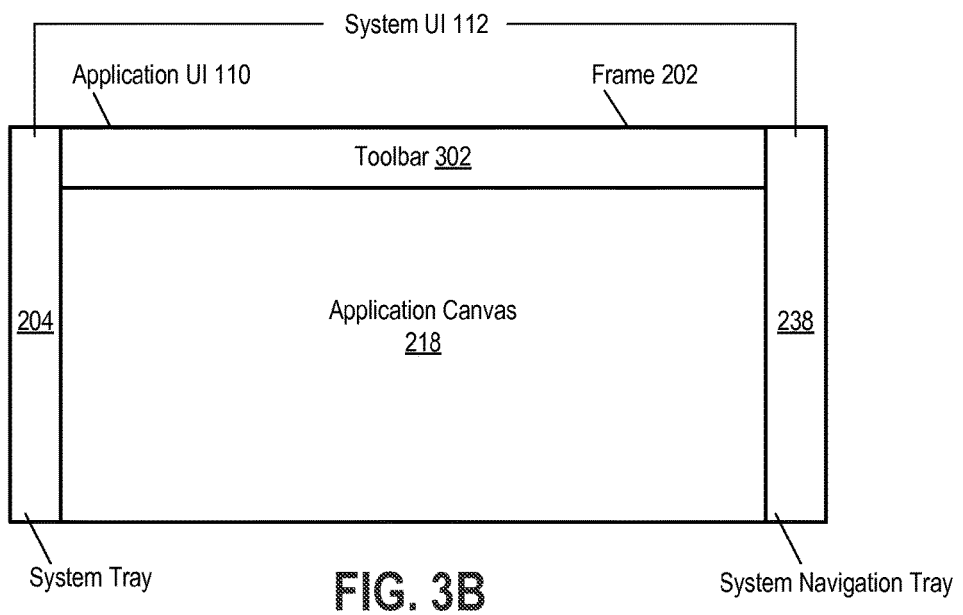
Figure 3C:
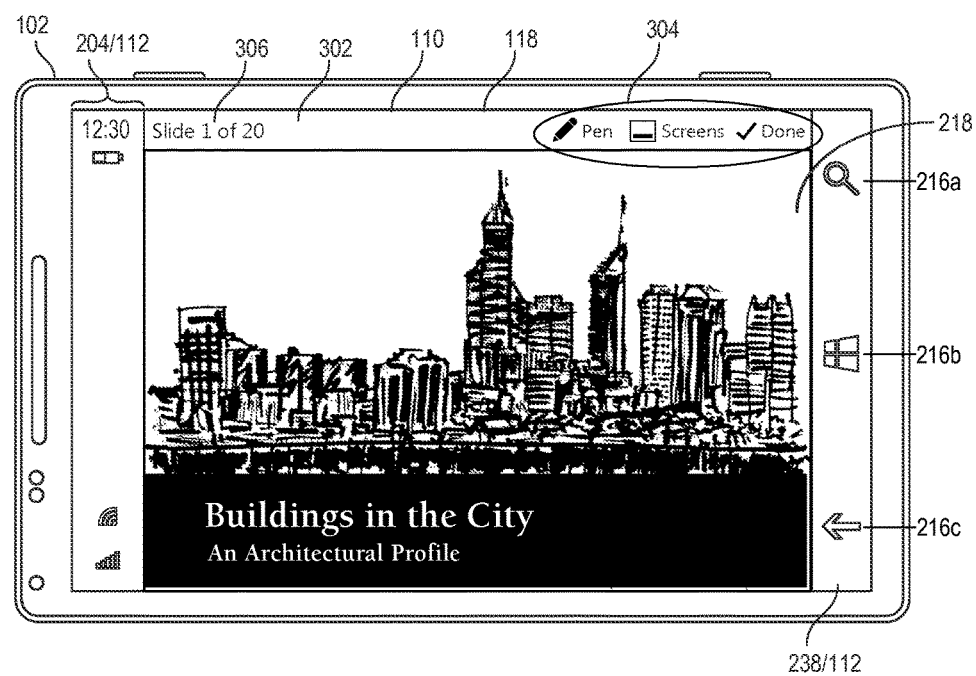

In some examples and as illustrated in FIGS. 3A-C, in a toolbar mode 300, the application UI 110 includes a toolbar 302. As illustrated in FIG. 3C, the toolbar 302 includes a toolbar command region 304 including one or more commands (e.g., Pen, Screens, and Done) to enable quick editing of the application canvas 218. In some examples, the toolbar 302 includes a toolbar informational region 306 for displaying information about content displayed in the application canvas 218, for example, a page number, slide number/count, sheet number/name, etc. According to an aspect, the toolbar mode 300 is a mode where the application 108 does not transition to a palette mode. According to an aspect, the application 108 may be in the toolbar mode 300 in response to user-interaction. In some examples, the toolbar 302 is transiently displayed (i.e., is displayed on-demand until focus is removed or for a time duration). In other examples, the toolbar 302 is sticky (i.e., the interface maintains a current open/closed state until the user modifies the interface). In some instances, a user may modify the interface mode by swiping in from an edge of the display 118. In such an example, the application canvas 218 does not resize when the toolbar 302 is displayed. According to another aspect, the application 108 code may automatically toggle the mode to the toolbar mode 300.

In some examples and as illustrated in FIGS. 4A, 4B, 4C, 4D, and 4E, in an edit mode 400, the application UI 110 includes a title bar 402. According to examples, the title bar 402 is located above the application canvas 218. When the small form factor computing device 102 is oriented in a portrait orientation, such as in FIGS. 4A, 4C, and 4D, the title bar 402 is positioned below the system tray 204. In some examples, the application 108 code includes a background color property of the application title bar 402 that sets the background color of the application title bar 402 to a color that is associated with the current application 108. For example, if the current application 108 is a word processing application, a background color property may define for the background color of the application title bar 402 to be blue, green for a spreadsheet application, red for a slide presentation application, purple for a notes application, etc. According to an aspect, the application 108 includes instructions in the small form factor device specific code to set the background color of the system tray 204 to a color that is associated with a particular application 108. In some examples, the adaptive UI display module 106 is operable to set the background color of the system tray 204 based on the current application 108 when the small form factor device 102 is in a portrait orientation, such that the application title bar 402 and the system tray 204 are co-located on a same side (e.g., top edge) of the display 118 and have a same background color. Accordingly, the title bar 402 and the system tray 204 appear as a cohesive group. When the small form factor computing device 102 is oriented in a landscape orientation, such as in FIGS. 4B and 4E, the title bar 402 is aligned with a top edge of the display 118.

Figure 4C:
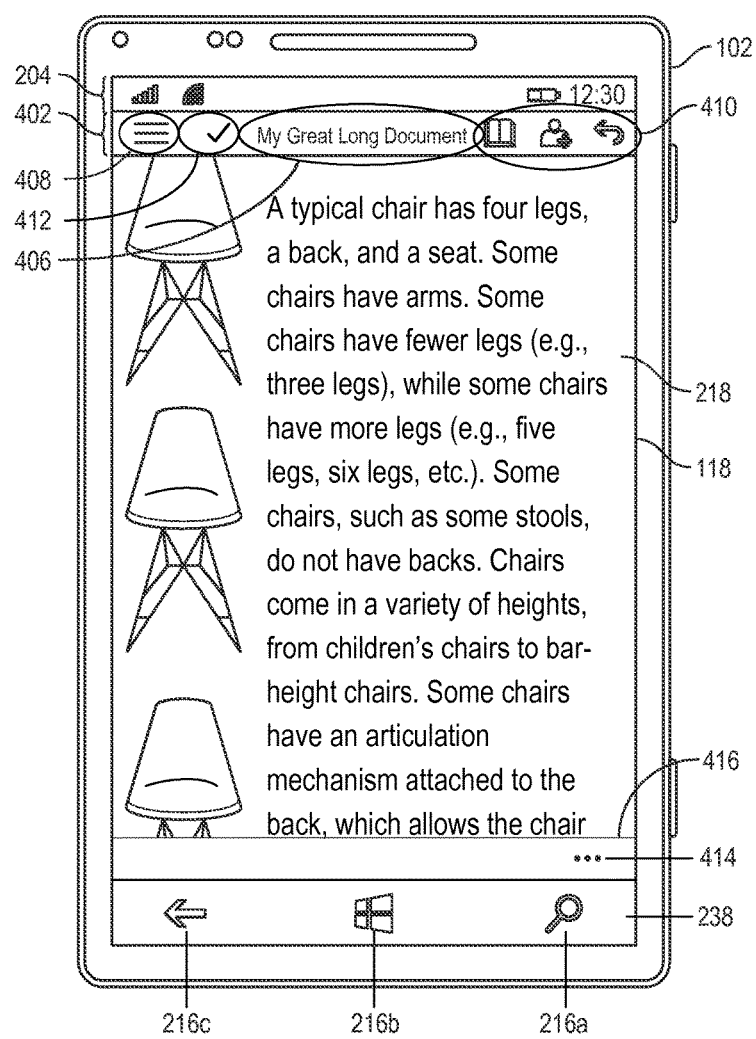
Figure 4D:
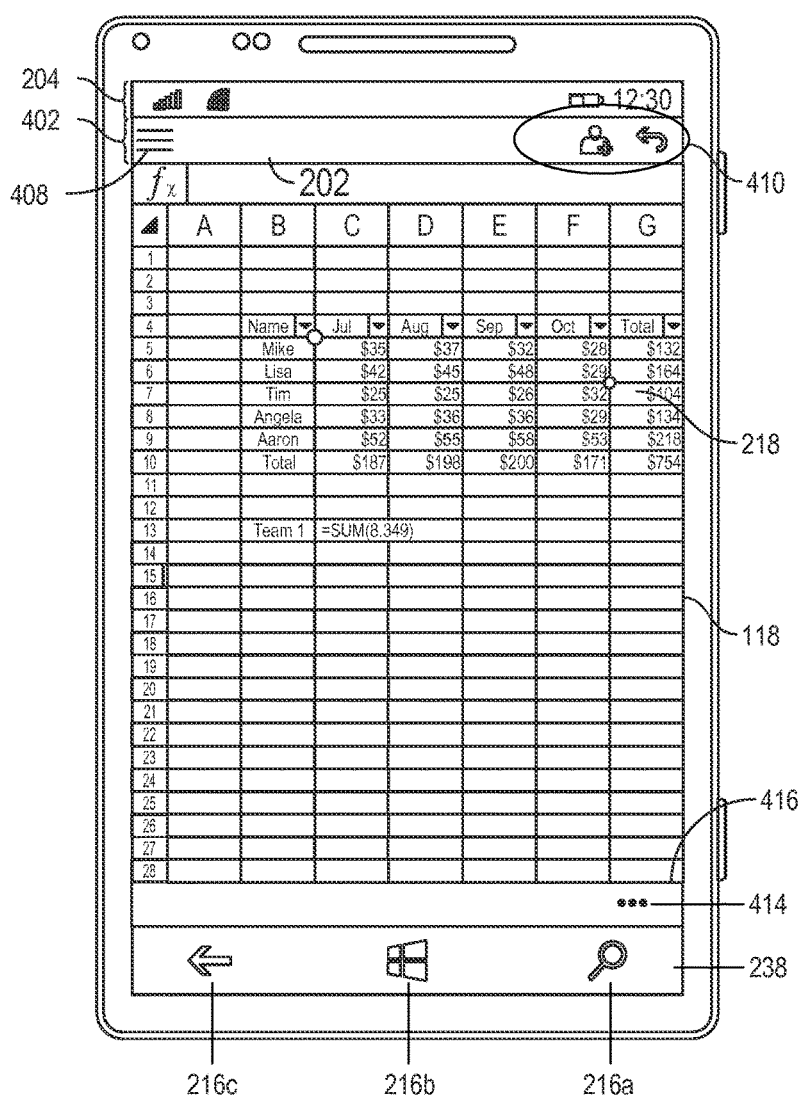
Figure 4E:
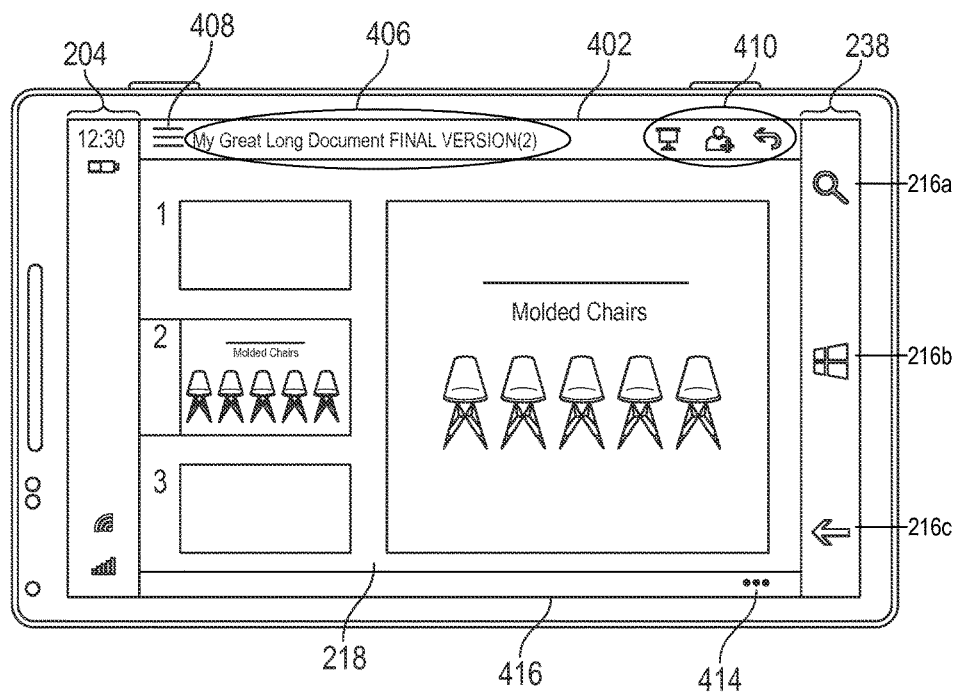

In some examples, and as illustrated in FIGS. 4C, 4D, and 4E, the title bar 402 includes one or more informational and command regions, such as a document informational region 406, a status region 412, a first quick command region 410, and a second quick command region 408. The document informational region 406 includes document-specific information, such as a document title, page name, or section name. In some examples, the status region 412 includes a display of a sync indicator. The sync indicator provides the status of a sync/save operation of the document to an external server. The sync indicator may be represented by an icon, glyph, or text, or as an icon or glyph in combination with text. In some examples, the status region 412 is positioned adjacent to the document informational region 406 in the title bar 402. In other examples, the status region 412 is positioned elsewhere in the title bar 402 as desired, or may not be displayed.

In some examples, the first quick command region 410 is provided in-line with other displayed elements in the title bar 402. The first quick command region 410 displays one or more quick commands (e.g., share, undo, redo, mode selector, etc.), thus providing global access to a small number of key commands. Selection of a quick command may either initiate an action (e.g., undo), initiate a state or mode change (e.g., immersive mode, toolbar mode, edit mode, palette mode), or initiate the display of another application UI element, for example, a pane, where additional selections may be displayed and further action may be taken by the user 116. In some examples, one or more quick commands persist during space-constrained scenarios. In some examples, the first quick command region 410 is positioned adjacent to the document informational region 406. In some examples, the first quick command region 410 is positioned below the document informational region 406 (e.g., in a separate line within the title bar 402). In other examples, the first quick command region 410 is positioned elsewhere in the title bar 402 as desired or may not be displayed.

In some examples, the second quick command region 408 displaying one or more quick commands or a selectable functionality for accessing one or more quick commands is provided with other displayed elements in the title bar 402. According to an aspect, the second quick command region 408 includes quick commands (or access to quick commands) not associated with a particular task, for instance, general file commands generally found and used across a number of different software applications, such as "open," "save," and "print." According to another aspect, the second quick command region 408 includes a navigational command, such as a back command. In some examples, the second quick command region 408 is positioned adjacent to the document informational region 406. In some examples, the second quick command region 408 is positioned below the document informational region 406 (e.g., in a separate line within the title bar 402). In other examples, the second quick command region 408 is positioned elsewhere in the title bar 402 as desired, or may not be displayed.

In some examples, the edit mode 400 includes a hint state, where a collapsed hint state palette bar 416 is displayed in the application UI 110. According to an aspect, the hint state is a default state in the edit mode 400. According to another aspect, the application code may toggle the state. According to an aspect, the collapsed hint state palette bar 416 includes a switcher element 414. In some examples, the switcher element 414 is in the form an ellipsis, a chevron, an asterisk, or a downward facing chevron. This list is exemplary only and is not meant to be limiting. The user 116 of the application 108 may toggle the state, for example, by selecting the switcher element 414. In response to a selection of the switcher element 414, additional functionality commands and functionalities may be displayed, for example, in an expanded palette UI element as will be described in further detail below. In some examples, one or more functionality commands are displayed in the collapsed hint state palette bar 416.

Figure 4F:
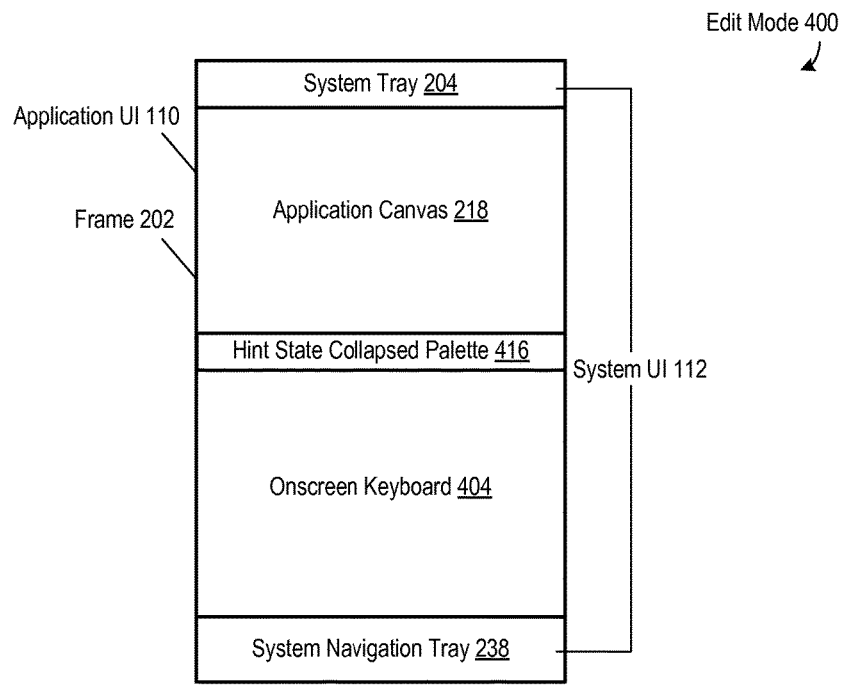
Figure 4G:
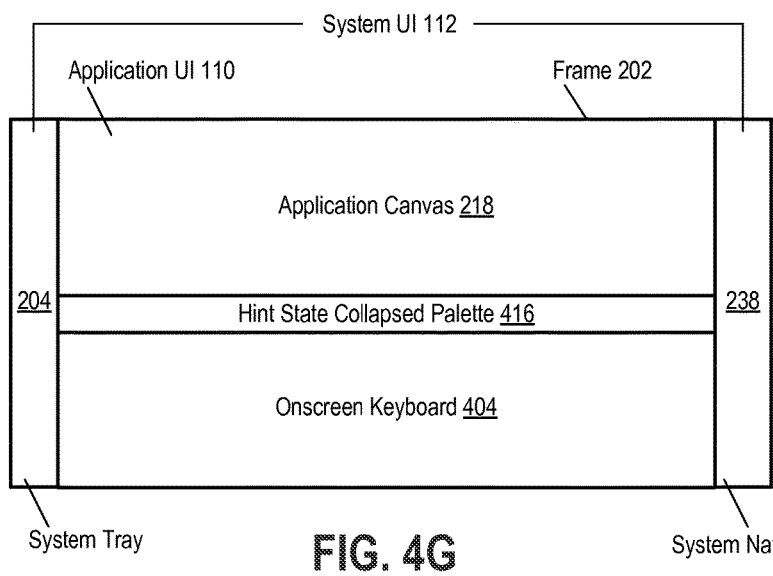
Figure 4H:
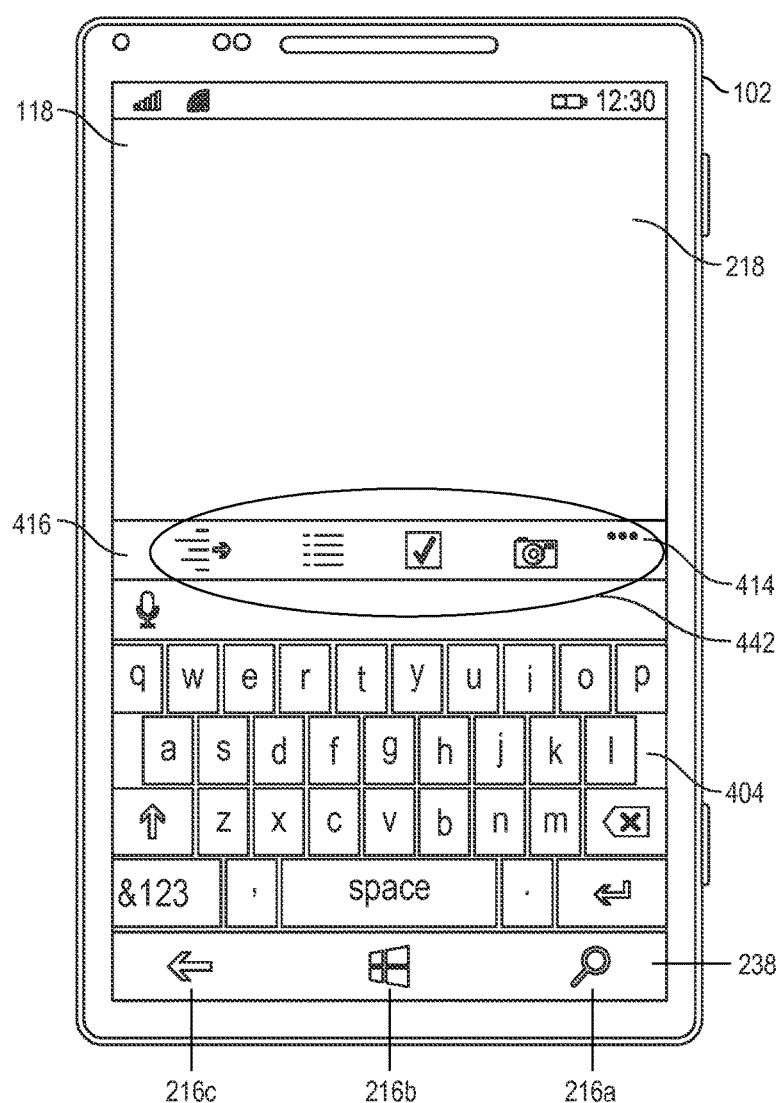

In some examples and as illustrated in FIGS. 4F, 4G, and 4H, in the edit mode 400, the title bar 402 is not displayed in the application UI 110, such as when an onscreen keyboard 404, palette, or pane shares the application UI 110 with the application canvas 218. In some examples, the system tray 204 is hidden, for example, depending on the application 108, a mode of the application 108, etc.

As shown in FIG. 4H, in some examples, a third quick command region 442 displaying a plurality of quick commands is provided in the collapsed hint state palette bar 416. In some examples, the quick commands displayed in the third quick command region 442 are commands that affect content in the application canvas 218, for example, commands used to read, modify, or use the content, or to change the view.

According to an aspect, the edit mode 400 is a default mode when working with a document. According to another aspect, the application 108 may be in the edit mode 400 in response to a user-selection of a functionality associated with toggling the mode of the application 108. According to another aspect, the application 108 code may automatically toggle the mode to the edit mode 400.

Figure 5A:
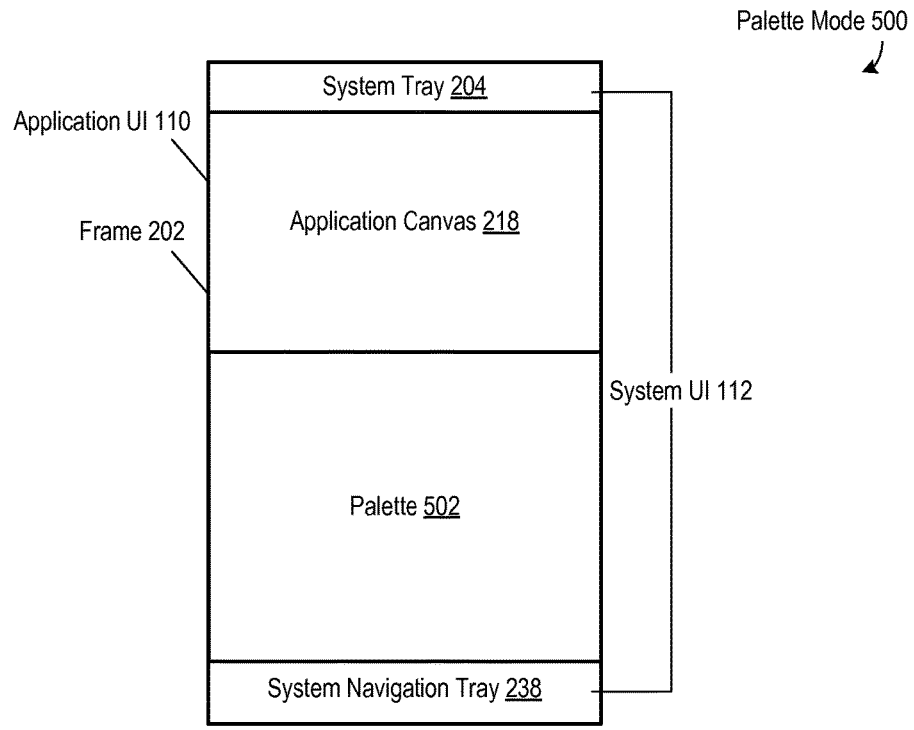
FIGS. 5A-C are illustrations showing various application UI elements in an example adaptable user interface display on a small form factor computing device when an application is in a palette mode.
Figure 5B:
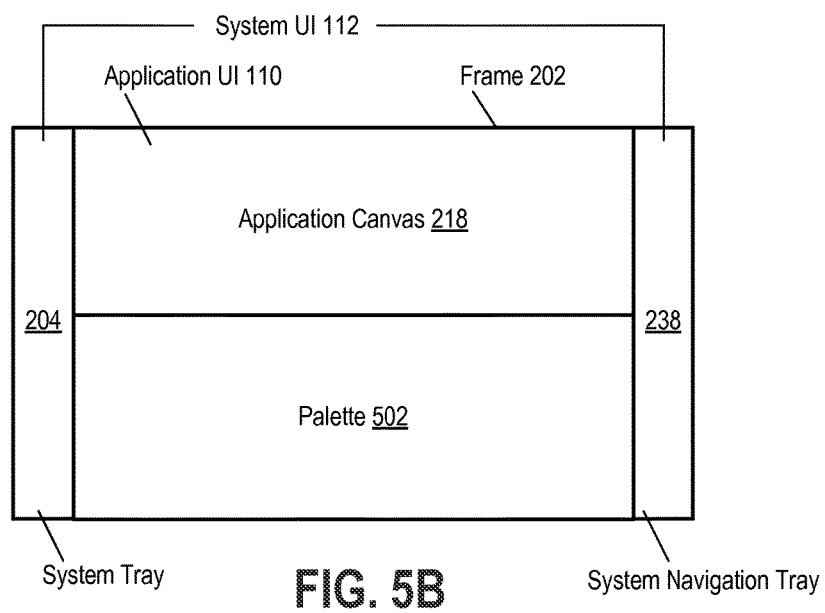
Figure 5C:
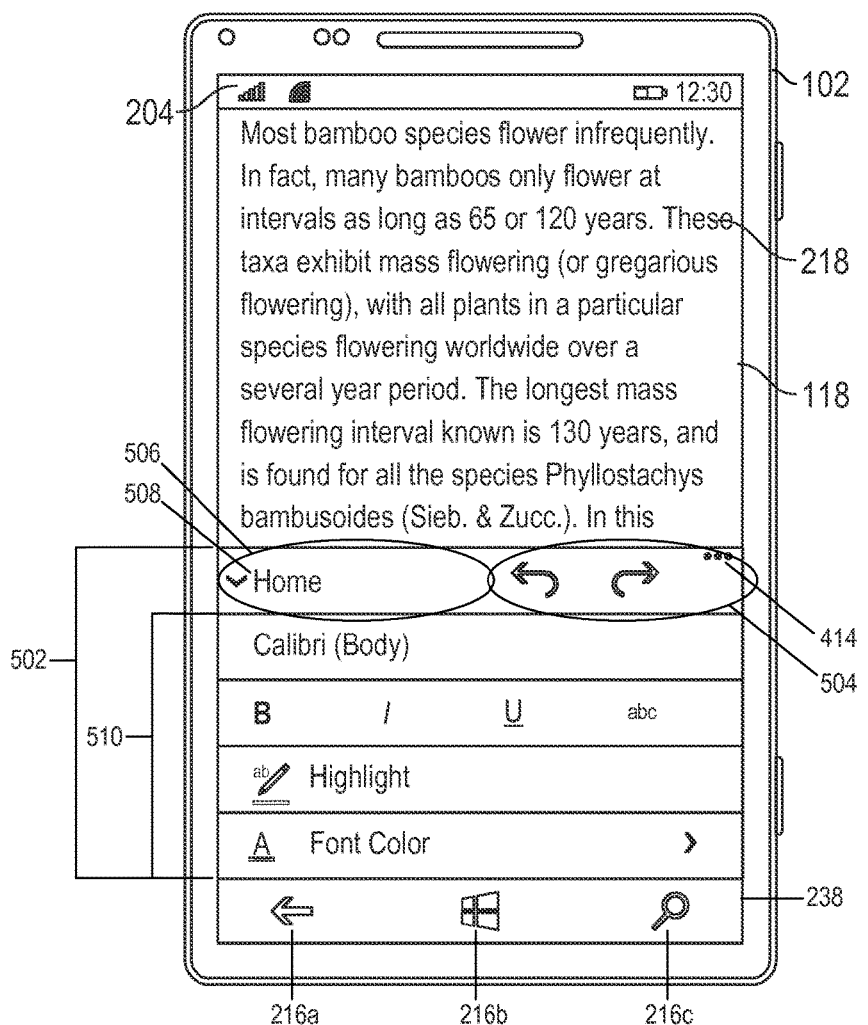

In some examples and as illustrated in FIGS. 5A-C, in a palette mode 500, the application UI 110 includes a palette 502 UI element. The palette 502 is a designated area or space within the frame 202 when the application 108 is in the palette mode 500 that organizes and provides commands and/or controls for selection by the user 116 of the application 108. As stated, the palette 502 UI element is displayed when the application 108 is in the palette mode 500, for example, when the switcher element 414 displayed in the collapsed hint state palette bar 416 is selected by the user 116 of the application 108, when the collapsed hint state palette bar 416 is selected by the user 116 of the application 108, or when another functionality is selected by the user 116 that involves a display of selectable controls associated with task-based functionality under the given software application 108. According to another aspect, the application code may automatically toggle the mode to the palette mode 500.

According to some examples and as illustrated in FIG. 5C, the palette 502 UI element includes a plurality of command regions. For example, the palette 502 includes a functionality command region 506 displaying a top-level functionality command 508 associated with task-based functionality provided by the application 108. In some examples, the top-level functionality command 508 is a tab into which a plurality of selectable controls associated with the top-level functionality command 508 is organized. The plurality of selectable controls associated with the top-level functionality command 508 is displayed in a palette controls region 510 in the palette 502 UI element. In some examples, a top-level functionality command 508 is a selectable control providing access to a superset of features or functionalities. In response to a selection of the top-level functionality command 508, additional top-level functionality commands 508 are displayed for selection by the user 116. For example, top-level functionality commands 508 may include a "file," a "home," an "insert," a "design," a "review" and a "view" command. Examples are not limited to these example commands, and it should be appreciated that any number of commands may be included in an initial or adjusted display of the functionality command region 506.

In some examples, the palette 502 includes a fourth quick command region 504. According to an aspect, the quick commands displayed in the fourth quick command region 504 include commands that relate to changing the document's content. In some examples, the fourth quick command region 504 is positioned in-line with the top-level functionality command 508 in the functionality command region 506. In other examples, the fourth quick command region 504 is positioned elsewhere in the application UI 110, or may not be displayed.

Figure 6:
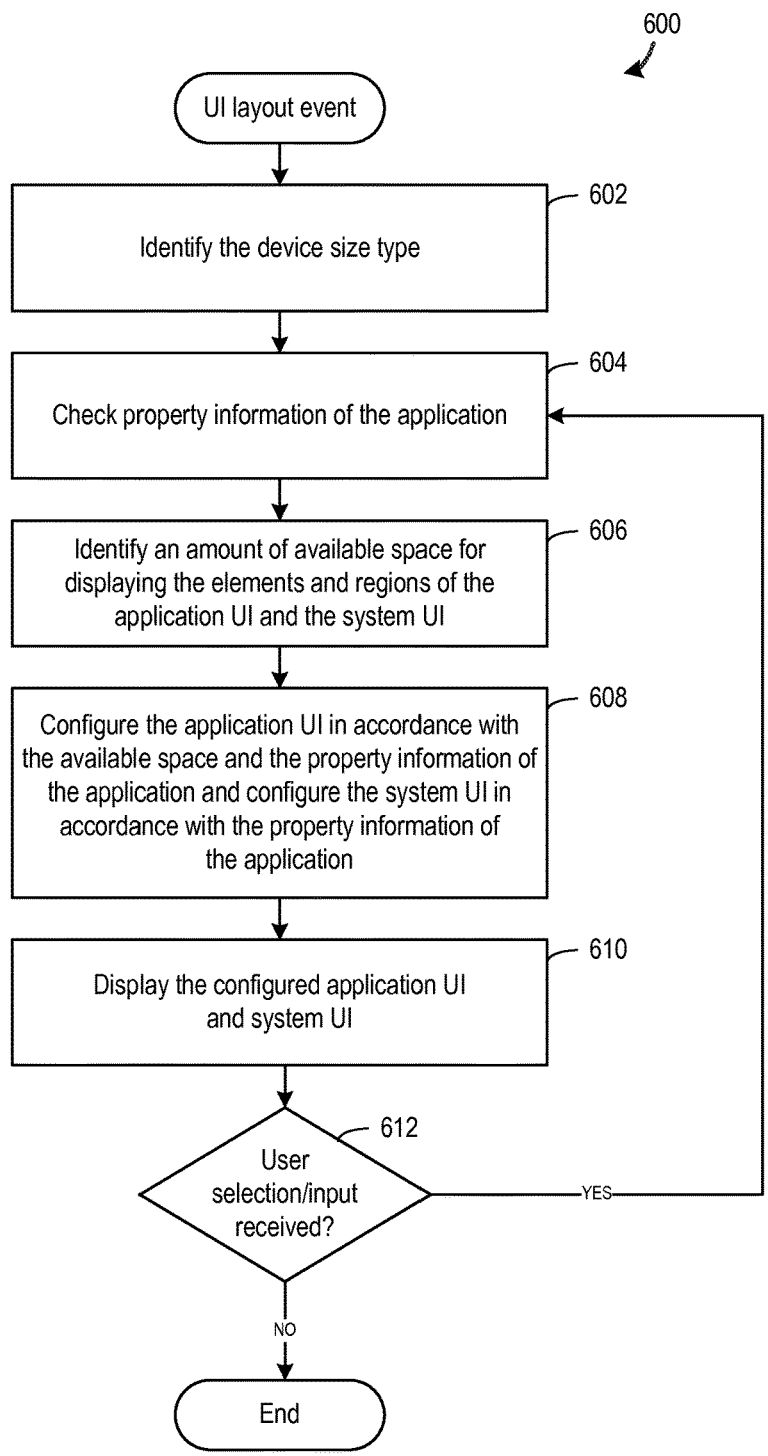
FIG. 6 is a flow chart showing general stages involved in an example method for automatically adapting a user interface display on a small form factor computing device.

The following discussion describes an example method for configuring the user interface 110 of the application 108 and the user interface 112 of the operating system 104 based on the type of computing device 101 on which the application 108 is being provided. In portions of the following discussion, reference will be made to the environment depicted above in FIG. 1. In at least some examples, aspects of the method may be displayed via an entity discussed above, such as the small form factor computing device 102 of FIG. 1. However, references to specific elements above are for illustrative purposes only, and do not limit the disclosure to the examples described herein. The process described below is illustrated in FIG. 6, where aspects of the examples are depicted in a flow chart that describes general stages involved in the example method 600.

The method 600 begins when an event that affects the application UI 110 layout occurs, such as a selection to instantiate an application 108 on a computing device 101, a selection to instantiate a document, a change in the display configuration (e.g., orientation) of the device 101 (e.g., caused by reorienting the display), a change in the state or mode of the application 108, a change in display configuration of the display 118 (e.g., connection of an external display 118, moving a display of the application 108 onto another display 118, etc.), user input, etc. When such an event occurs, an identification operation 602 occurs, where the size of the display 118 of the computing device 101 on which the application 108 is being provided or of the external display if one is connected is identified. According to an aspect, the size of the display 118 is a diagonal measure of the display 118. A determination is made as to whether the size of the display 118 is within a threshold size of a small form factor computing device 102 or of a large form factor computing device. Upon a determination that the size of the display 118 is within the threshold size of a small form factor computing device 102, the computing device 101 is identified as a small form factor computing device 102.

The method 600 continues to a properties check operation 604, where the adaptive UI display module 106 receives information from the application 108 associated with which application UI elements to display in the UI, for example, based on the application (e.g., a word processing application, a spreadsheet application, a slide presentation application, etc.), the mode and state of the application (e.g., immersive mode 200, toolbar mode 300, edit mode 400, palette mode 500, hint state, expanded state, etc.), the document status and content. For example, the application 108 supplies layout information, such as which UI elements to show, which regions to include in the UI elements, which functionalities, controls, and information to display in the regions, etc. According to an aspect, the properties check operation 604 includes receiving scaling information associated with sizing, scaling, and truncating UI elements, regions, functionalities, controls, and information such that the adaptive UI display module 106 is operable to intelligently adapt the application UI 110 to different device sizes, window sizes, and orientations.

According to an example, during the properties check operation 604, and with reference to FIG. 4C, the application 108 may supply such information as: the application 108 is a word processing application, the name of the document is "My Great Long Document," that the document is synchronized/saved to an external server, the mode of the application is in the edit mode 400, the content of the document, and properties defining UI elements (e.g., mode, size, visibility, color, opacity, event handler, etc.). For example, a visibility property of a UI element defines whether the element is visible or collapsed. As another example, a background color property of a UI element, such as the application title bar 402 or the system tray 204, sets the background color of the UI element based on the current application 108. For example, if the current application 108 is a word processing application and the device is oriented in a portrait orientation, a background color property may define for the background color of the system tray 204 to be blue, green for a spreadsheet application, red for a slide presentation application, purple for a notes application, etc.

The method 600 continues to a size check OPERATION 606, where an amount of available application space is identified. In order to calculate the appropriate layout for the interface, an available application UI frame width or height is identified or calculated. According to examples, such calculations of available space includes determining the dimensions of the display 118. According to an aspect, the dimensions of the display 118 is an effective pixel count of the width and height of the device display 118. In some examples, the display dimensions are identified during the identification operation 602. In some instances, identifying an amount of available includes identifying a change in an amount of available space, such as, when a user rotates a device to change its orientation.

The method 600 continues to a configuration operation 608, where the adaptive UI display module 106 configures the application UI 110 in accordance with the available space and the properties information of the application 108 and configures the system UI 112 in accordance with the property information of the application 108. In some examples, the configuration operation 608 includes configuring the application UI 110 and the system UI 112 to include one or more UI elements (e.g., application canvas 218, application title bar 402, toolbar 302, collapsed hint state palette bar 416, expanded palette 502, onscreen keyboard 404, system tray 204, system navigation region 238, etc.) based on the properties (e.g., application type 108, mode, state, layout information, etc.) and the orientation of the small form factor computing device 102. In some examples, the configuration operation 608 includes configuring the application UI 110 and the system UI 112 to include one or more functionalities, controls, and information items in designated regions of the one or more UI elements. In some examples, the configuration operation 608 includes configuring the one or more UI elements in the application UI 110 and/or the system UI 112 according to visibility, color, opacity, and size properties.

In some examples, the configuration operation 608 includes scaling or truncating, or removing from the display one or more UI items (e.g., functionalities, controls, and information items) according to scaling information received from the application 108. According to an aspect, the scaling information comprises a hierarchical order of scaling the one or more UI items. In some examples, a comparison is made between the amount of space available and the amount of space needed for the multiple UI items and regions of UI items, for example, by calculating the size of each UI item. For instance, a pixel size may be determined for each item or region. According to some examples, a total available size needed to accommodate the interface is summed from the individual calculations.

In some examples, the application user interface 110 is configured to display a first number of functional controls and informational elements. That is, the interface may be designed to initiate the display of a full set of functional and informational regions in accordance with the small form factor computing device 102. For example, a first number of quick commands is displayed in the first quick command region 410, a first number of quick commands or a selectable functionality for accessing one or more quick commands in the second quick command region 408, document information in the document informational region 406, sync/save information in the status region 412, a first number of functionality commands, application information, a first number of top-level functionality commands 508 (e.g., in the form of tabs) in the functionality command region 506, etc. However, depending upon the amount of space available to the application (e.g., due to device type, orientation, etc.), each region may be constrained in terms of how many, if any, of each functional control and how much information, if any, may be displayed. Accordingly, to adjust the available space within a screen, the adaptive UI display module 106 may first determine, for example, how many pixels each region encompasses, and may then sum the pixel amounts to identify a total pixel size. A comparison may then be made between the total size needed and the amount of space available.

As will be described below, if there is not enough space available to accommodate an interface of a first size, the visual display of at least one of the multiple regions of application functionalities and information is adjusted. For example, one or more regions and/or UI items of the one or more regions are reduced until the total size is equivalent to the available size. When insufficient space is available in the interface for displaying regions, the adaptive UI display module 106 determines which regions may be truncated, collapsed, or eliminated.

In some examples, the visual display of the interface may be adjusted according to one or more predetermined scaling priorities to accommodate the identified display 118 size. Such an adjustment occurs prior to displaying the interface. As should be appreciated, depending upon the amount of space available for displaying the user interface, varying amounts of space will be available for each of the above described regions and items. To adjust the interface in response to available application space identification, a priority list or hierarchy of truncation may be implemented. In some examples, the priority list identifies whether a UI element or item should change in size or collapse, display a graphical representation of functionalities or a switcher element, etc. regions to display may be performed. Priority rules corresponding to the reduction/truncation hierarchy may be used to determine which aspects of the landscape are reduced. One or more priority rules may be utilized to identify which elements may first be truncated. In some examples, each element and/or region may be allocated an amount of space, which may be a percentage of the available space within the application. In other examples, some regions or elements of regions may be completely truncated.

In some examples, if the interface 110 lacks sufficient space to display all regions of functional controls and information, the size of the display of individual items (e.g., icons, glyphs, font size of text, etc.) may be reduced to allow space for the display of all regions. According to one aspect of this example, different sizes of items, for example small, medium and large, may be defined. In such examples, a determination may be made as to the available space. At a starting point, the largest size for each item may be presented. As required, the display size may be reduced (i.e., large to medium to small) for one or more items of a region until each region fits in the available space.

In some examples, the user interface 110 may display in "hint" mode, where only one or a few elements are displayed while the document is displayed. Hint mode may display a switcher element 414, which may serve as an entry point to additional functionality and/or information. In some examples, hint mode may also display, for instance, the document title or document number, or a truncated version of either of those. Displaying such a hint provides a visual reminder to a user that a UI element or a UI element of the user interface 110 is hidden, while surfacing one or a few aspects of the document or application 108 that might be considered helpful when working with the document. In hint mode, the state of the interface may be toggled from a default expanded state to a minimal "hint" state, and back, for example, depending on device or screen size.

In some examples, one or more user interface elements or regions may appear transiently, covering a portion of the display 118 without the application canvas resizing. For instance, in certain modes where a less invasive user interface may be desired, one or more transient user interface elements or regions may appear briefly (for instance, upon a touch event on the display 118 or upon activation of a switcher element 414), and may then be dismissed manually by the user 116 or automatically hide after a set time interval.

The method 600 continues to a display operation 610, where the application UI 110 and/or system UI 112 are displayed according to the layout configured by operation 608.

In some examples, the method 600 continues to decision operation 612, where a determination is made as to whether an indication of a user selection or other input is received. Various user selections or input may be received. For example, the application 108 may receive an indication of a selection of a selectable control or functionality, a selection to display a hidden UI element, a selection to expand a collapsed UI element, etc. In another example, the user 116 may change the orientation of the small form factor computing device 102, or may choose to resize the application UI 110.

When a determination is made that a user selection or other input is received, the method 600 returns to the properties check operation 604, where the adaptive UI display module 106 receives information from the application 108 associated with which application UI elements to display in the UI and the properties associated with how to display the elements.

Aspects of a system for automatically adapting a user interface display on a small form factor computing device 102 include a processor, a memory, and an output device for presenting a visual output to a user 116, the visual output comprising the user interface 110 of an application 108, the computing device operable to: configure the user interface 110 of an application 108 based on a type of computing device 101 on which the application 108 is being provided, for example, a small form factor computing device 102 by adjusting a visual display of one or more regions of application functionalities and information in accordance with the small form factor computing device 102. For example, in response to receiving an indication of an event that affects a layout of the application UI 110 (e.g., a selection to instantiate the application 108 on the computing device 101, a selection to instantiate a document, a change in the display configuration (e.g., orientation) of the device (e.g., caused by reorienting the display), a change in the mode and/or state of the application 108, user input, etc.), the adaptive UI display module 106 is operable to check the size of the display 118, and determine whether the device 101 is a small form factor computing device 102 or a large form factor computing device. In response to a determination that the device is a small form factor computing device 102, the adaptive UI display module 106 is further operable to check the dimensions of the display 118 and property information of the application 108 (e.g., a mode or state of the application 108, layout information, scaling information, etc.), and configure the application UI 110 in accordance with the display dimensions and property information. The adaptive UI display module 106 is further operable to configure one or more regions of a user interface 112 of an operating system 104 of the device in accordance with property information provided by the application 108.

While examples have been described in the general context of program modules that execute in conjunction with an application program that runs on an operating system on a computer, those skilled in the art will recognize that examples may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which aspects are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 7:
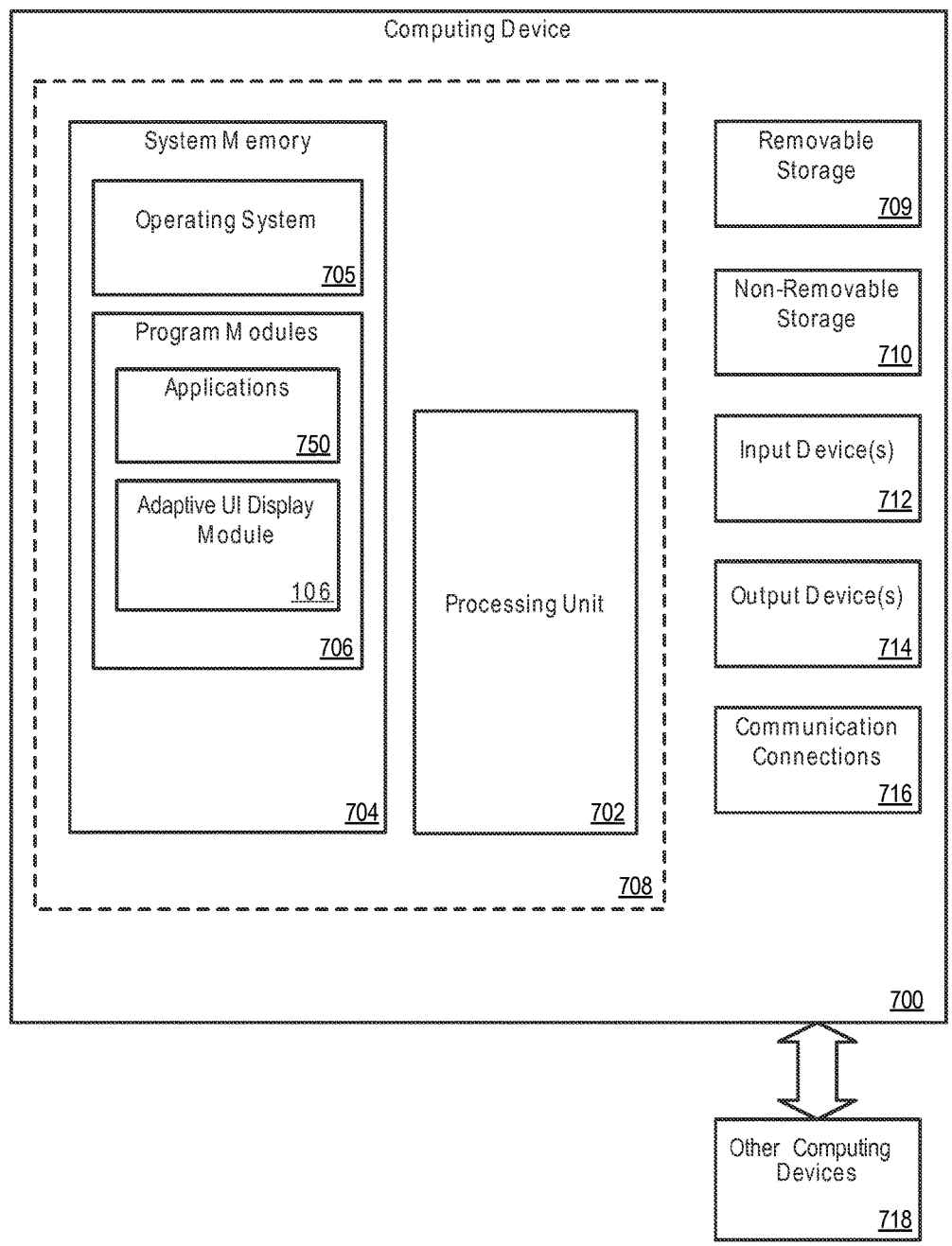
FIG. 7 is a block diagram illustrating one example of the physical components of a computing device.
Figure 8A:
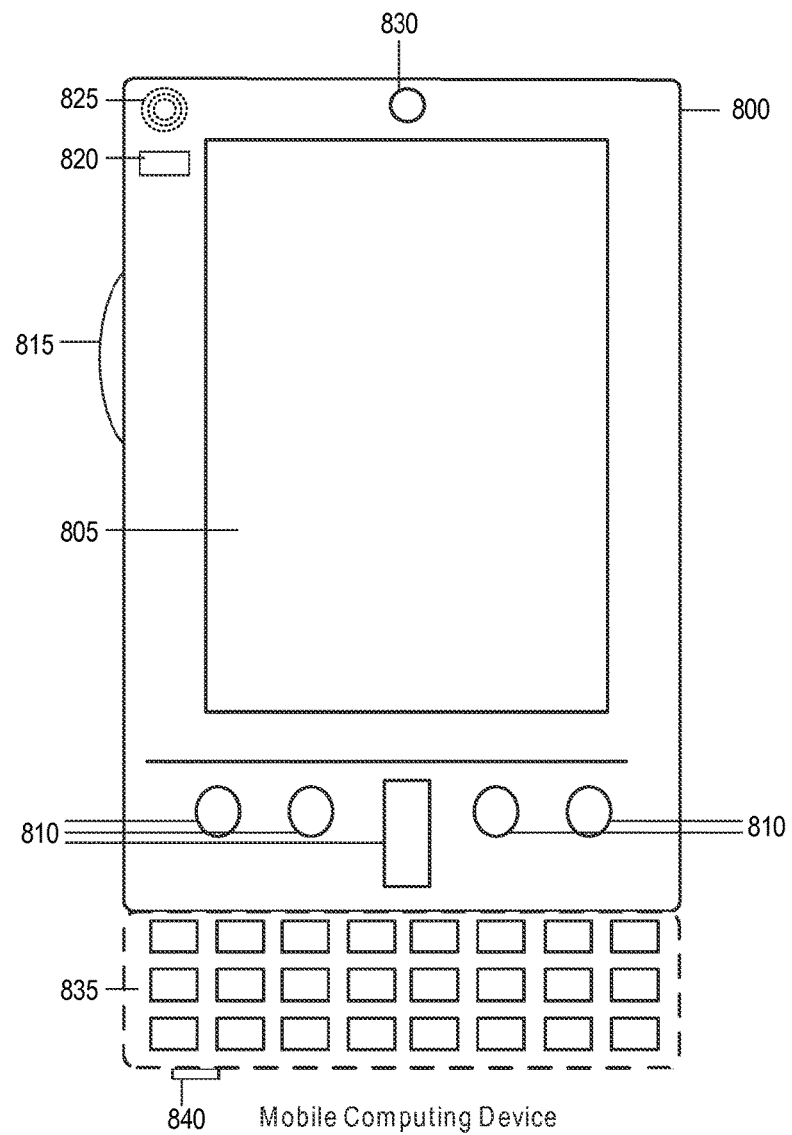
FIGS. 8A and 8B are simplified block diagrams of a mobile computing device.
Figure 8B:
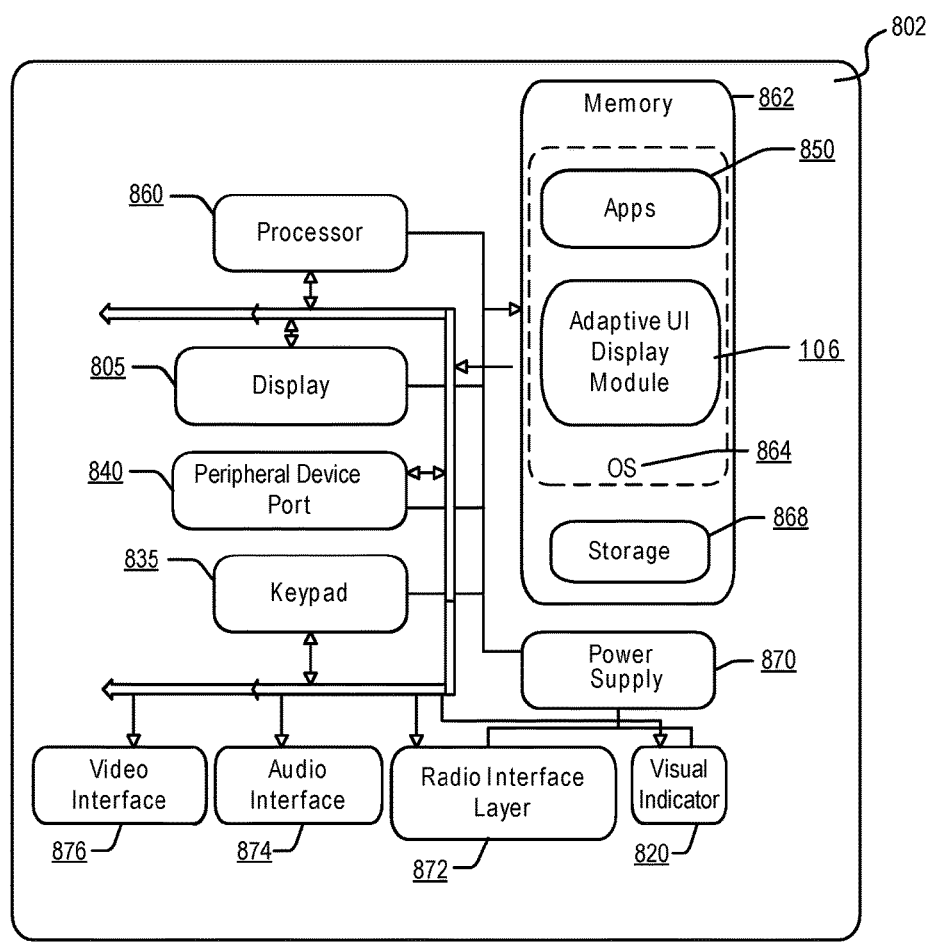
Figure 9:
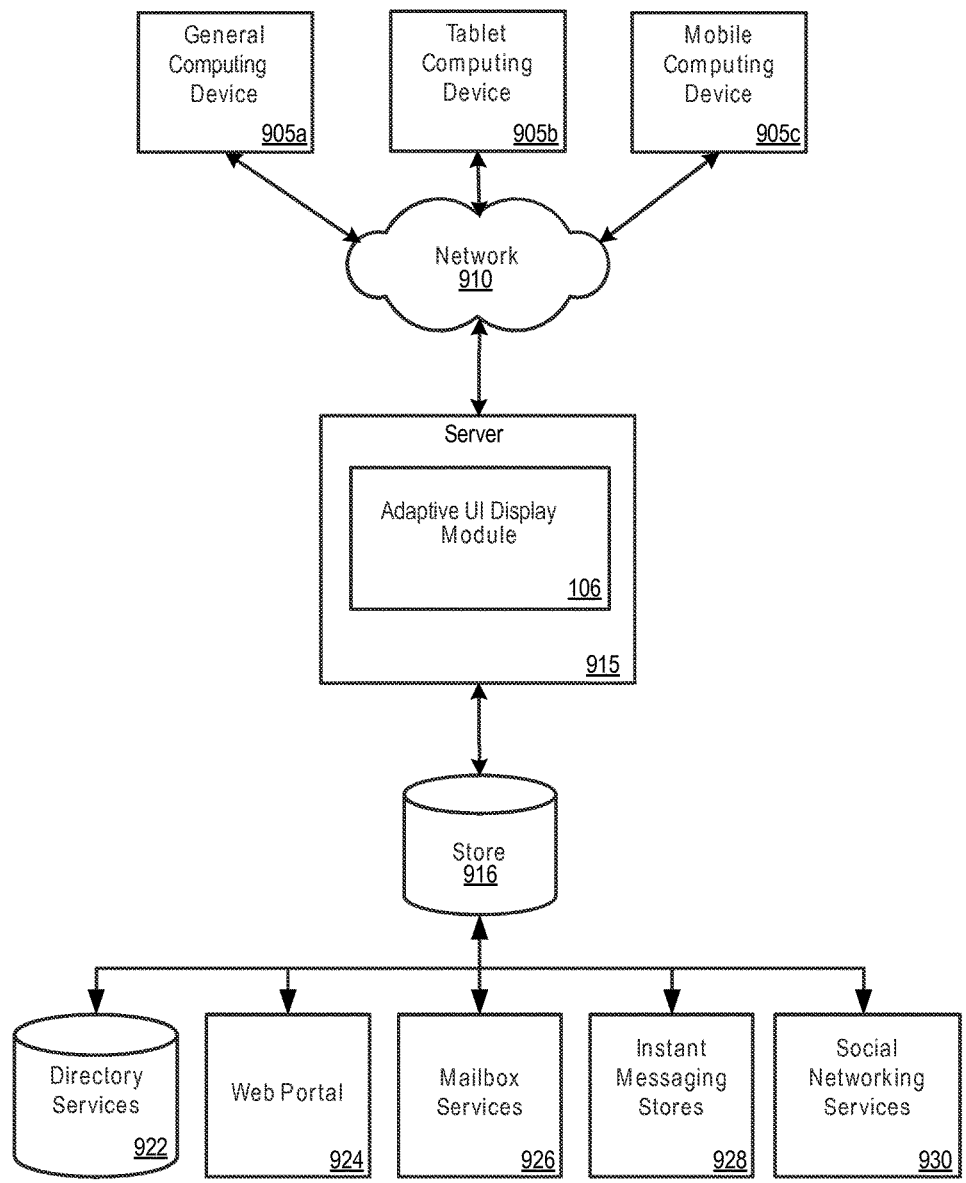
FIG. 9 is a simplified block diagram of a distributed computing system.

FIGS. 7-9 and the associated descriptions provide a discussion of a variety of operating environments in which examples are practiced. However, the devices and systems illustrated and discussed with respect to FIGS. 7-9 are for purposes of example and illustration and are not limiting of a vast number of computing device configurations that are utilized for practicing aspects, described herein.

FIG. 7 is a block diagram illustrating physical components (i.e., hardware) of a computing device 700 with which examples of the present disclosure are be practiced. In a basic configuration, the computing device 700 includes at least one processing unit 702 and a system memory 704. According to an aspect, depending on the configuration and type of computing device, the system memory 704 comprises, but is not limited to, volatile storage (e.g., random access memory), non-volatile storage (e.g., read-only memory), flash memory, or any combination of such memories. According to an aspect, the system memory 704 includes an operating system 705 and one or more program modules 706 suitable for running software applications 750. According to an aspect, the system memory 704 includes the adaptive UI display module 106. The operating system 705, for example, is suitable for controlling the operation of the computing device 700. Furthermore, aspects are practiced in conjunction with a graphics library, other operating systems, or any other application program, and is not limited to any particular application or system. This basic configuration is illustrated in FIG. 7 by those components within a dashed line 708. According to an aspect, the computing device 700 has additional features or functionality. For example, according to an aspect, the computing device 700 includes additional data storage devices (removable and/or non-removable) such as, for example, magnetic disks, optical disks, or tape. Such additional storage is illustrated in FIG. 7 by a removable storage device 709 and a non-removable storage device 710.

As stated above, according to an aspect, a number of program modules and data files are stored in the system memory 704. While executing on the processing unit 702, the program modules 706 (e.g., adaptive UI display module 106) performs processes including, but not limited to, one or more of the stages of the method 600 illustrated in FIG. 6. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 7 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 700 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 700 has one or more input device(s) 712 such as a keyboard, a mouse, a pen, a sound input device, a touch input device, etc. The output device(s) 714 such as a display, speakers, a printer, etc. are also included according to an aspect. The aforementioned devices are examples and others may be used. According to an aspect, the computing device 700 includes one or more communication connections 716 allowing communications with other computing devices 718. Examples of suitable communication connections 716 include, but are not limited to, RF transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. According to an aspect, any such computer storage media is part of the computing device 700. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 8A and 8B illustrate a mobile computing device 800, for example, a mobile telephone, a smart phone, a tablet personal computer, a laptop computer, and the like, with which aspects may be practiced. With reference to FIG. 8A, an example of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. According to an aspect, the display 805 of the mobile computing device 800 functions as an input device (e.g., a touch screen display). If included, an optional side input element 815 allows further user input. According to an aspect, the side input element 815 is a rotary switch, a button, or any other type of manual input element. In alternative examples, mobile computing device 800 incorporates more or less input elements. For example, the display 805 may not be a touch screen in some examples. In alternative examples, the mobile computing device 800 is a portable phone system, such as a cellular phone. According to an aspect, the mobile computing device 800 includes an optional keypad 835. According to an aspect, the optional keypad 835 is a physical keypad. According to another aspect, the optional keypad 835 is a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some examples, the mobile computing device 800 incorporates a vibration transducer for providing the user with tactile feedback. In yet another example, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one example of a mobile computing device. That is, the mobile computing device 800 incorporates a system (i.e., an architecture) 802 to implement some examples. In one example, the system 802 is implemented as a "smart phone" capable of running one or more applications (e.g., browser, e-mail, calendaring, contact managers, messaging clients, games, and media clients/players). In some examples, the system 802 is integrated as a computing device, such as an integrated personal digital assistant (PDA) and wireless phone.

According to an aspect, one or more application programs 850 are loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. According to an aspect, the adaptive UI display module 106 is loaded into memory 862. The system 802 also includes a non-volatile storage area 868 within the memory 862. The non-volatile storage area 868 is used to store persistent information that should not be lost if the system 802 is powered down. The application programs 850 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800.

According to an aspect, the system 802 has a power supply 870, which is implemented as one or more batteries. According to an aspect, the power supply 870 further includes an external power source, such as an AC adapter or a powered docking cradle that supplements or recharges the batteries.

According to an aspect, the system 802 includes a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 850 via the operating system 864, and vice versa.

According to an aspect, the visual indicator 820 is used to provide visual notifications and/or an audio interface 874 is used for producing audible notifications via the audio transducer 825. In the illustrated example, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. According to an aspect, the system 802 further includes a video interface 876 that enables an operation of an on-board camera 830 to record still images, video stream, and the like.

According to an aspect, a mobile computing device 800 implementing the system 802 has additional features or functionality. For example, the mobile computing device 800 includes additional data storage devices (removable and/or non-removable) such as, magnetic disks, optical disks, or tape. Such additional storage is illustrated in FIG. 8B by the non-volatile storage area 868.

According to an aspect, data/information generated or captured by the mobile computing device 800 and stored via the system 802 is stored locally on the mobile computing device 800, as described above. According to another aspect, the data is stored on any number of storage media that is accessible by the device via the radio 872 or via a wired connection between the mobile computing device 800 and a separate computing device associated with the mobile computing device 800, for example, a server computer in a distributed computing network, such as the Internet. As should be appreciated such data/information is accessible via the mobile computing device 800 via the radio 872 or via a distributed computing network. Similarly, according to an aspect, such data/information is readily transferred between computing devices for storage and use according to well-known data/information transfer and storage means, including electronic mail and collaborative data/information sharing systems.

In yet another example, the mobile computing device 800 incorporates peripheral device port 840, such as an audio input (e.g., a microphone jack), an audio output (e.g., a headphone jack), and a video output (e.g., a HDMI port) for sending signals to or receiving signals from an external device.

FIG. 9 illustrates one example of the architecture of a system for automatically adapting an application user interface display on a small form factor computing device 102 as described above. Content developed, interacted with, or edited in association with the adaptive UI display module 106 is enabled to be stored in different communication channels or other storage types. For example, various documents may be stored using a directory service 922, a web portal 924, a mailbox service 926, an instant messaging store 928, or a social networking site 930. The adaptive UI display module 106 is operable to use any of these types of systems or the like for automatically adapting an application user interface display on a small form factor computing device 102, as described herein. According to an aspect, a server 915 provides the adaptive UI display module 106 to clients 905a,b,c. As one example, the server 915 is a web server providing the adaptive UI display module 106 over the web. The server 915 provides the adaptive UI display module 106 over the web to clients 905 through a network 910. By way of example, the client computing device is implemented and embodied in a personal computer 905a, a tablet computing device 905b or a mobile computing device 905c (e.g., a smart phone), or other computing device. Any of these examples of the client computing device are operable to obtain content from the store 916.

Techniques for providing a scalable user interface are described. Although examples are described in language specific to structural features and/or methodological acts, it is to be understood that the examples defined in the appended claims are not necessarily limited to the specific features or acts described above. Rather, the specific features and acts are disclosed as example forms of implementing the claimed examples.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Furthermore, an operation shown with respect to a particular method may be combined and/or interchanged with an operation of a different method in accordance with one or more implementations. Aspects of the methods may be implemented via interaction between various entities discussed above with reference to the user interface.

Aspects, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Examples should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

What is claimed is:

1. A method for improving operation of a computing device by automatically adapting a user interface display for a display device of a small form factor computing device, wherein the user interface display includes one of both of an application user interface display and an operating system user interface display, wherein the application user interface display includes a plurality of application user interface elements and is associated with an application being executed on the small form factor computing device, and wherein the operating system user interface display includes a plurality of operating system user interface elements and is associated with an operating system being executed on the small form factor computing device, the method comprising:

receiving, at the small form factor computing device, an indication of an event that affects a layout of the application user interface display;

in response to receiving the indication:

determining a size of the display device of the small form factor computing device;

receiving from the application, by an adaptive user interface (UI) module, property information of the application, wherein the property information includes layout information for the application user interface display, layout information for the operating system user interface display, and scaling information comprising a hierarchical order of scaling one or more user interface items;

determining an amount of available application space based on the size of the display device of the small form factor computing device;

comparing the amount of available application space to an amount of space needed to display items of the user interface display, wherein the amount of space needed to display items of the user interface display is a sum of sizes of each of the items of the user interface display;

adapting, by the adaptive UI module according to the scaling information of the property information of the application, the user interface display by scaling, truncating, or removing one or more of the plurality of application user interface elements and/or scaling, truncating, or removing one or more of the plurality of operating system user interface elements;

configuring, by the adaptive UI module, the application user interface display and the operating system user interface display in accordance with the property information of the application, including configuring, based on the property information of the application, a color of at least one of the plurality of operating system user interface elements dependent on a type of the application; and displaying the application user interface display and the operating system user interface display in accordance with the property information of the application.

2. The method of claim 1, wherein receiving, at the small form factor computing device, the indication of the event that affects a layout of the application user interface display includes receiving an indication of one of:

an instantiation of the application;
an instantiation of a document;
a change in a mode of the application;
a change in a display configuration of the small form factor computing device;
a change in a display configuration of the display;
a user selection; and
user input.

3. The method of claim 1, further comprising determining that the size of the display device is within a threshold associated with the small form factor computing device.

4. The method of claim 1, wherein the property information is associated with a mode of the application, wherein the mode includes one of:

an immersive mode;
a toolbar mode;
an edit mode; and
a palette mode.

5. The method of claim 1, wherein the items of the user interface display include one or more of:

an application title bar;
a system tray;
an application canvas;
a palette;
a collapsed hint state palette bar;
an onscreen keyboard;
a toolbar; and
a system navigation region.

6. The method of claim 1, wherein determining the amount of available application space includes determining a number of effective pixels available in a width and height of the display device.

7. The method of claim 1, wherein determining the amount of available application space includes determining an orientation of the small form factor computing device.

8. A small form factor computing device comprising:

a processor;
an output device for presenting a visual output to a user, the visual output comprising an application user interface; and
a memory including instructions to automatically adapt the user interface display for a display device of the small form computing device, wherein the user interface display includes one or both of the application user interface and an operating system user interface display, wherein the application user interface display includes a plurality of application user interface elements and is associated with an application being executed on the small form factor computing device, and wherein the operating system user interface display includes a plurality of operating system user interface elements and is associated with an operating system being executed on the small form factor computing device, wherein the instructions, when executed by the processor, cause the small form factor computing device to perform operations to:

receive, at the small form factor computing device, an indication of an event that affects a layout of the application user interface display;

in response to receiving the indication:

determine a size of the display device of the small form factor computing device;

receive from the application, by an adaptive user interface (UI) module, property information of the application, wherein the property information includes layout information for the application user interface display, layout information for the operating system user interface display and scaling information comprising a hierarchical order of scaling one or more user interface items;

determine an amount of available application space based on the size of the display device of the small form factor computing device;

compare the amount of available application space to an amount of space needed to display items of the user interface display, wherein the amount of space needed to display items of the user interface display is a sum of sizes of each of the items of the user interface display;

adapt, by the adaptive UI module according to the scaling information of the property information of the application, the user interface display by scaling, truncating, or removing one or more of the plurality of application user interface elements and/or scaling, truncating, or removing one or more of the plurality of operating system user interface elements;

configure, by the adaptive UI module, the application user interface display and the operating system user interface display in accordance with the property information of the application, including to configure, based on the property information of the application, a color of at least one of the plurality of operating system user interface elements dependent on a type of the application; and display the application user interface display and the operating system user interface display in accordance with the property information of the application.

9. The small form factor computing device of claim 8, wherein the event comprises one of:

an instantiation of the application;

an instantiation of a document;

a change in a mode of the application;

a change in a display configuration of the small form factor computing device;

a change in a display configuration of the display;

a user selection; and user input.

10. The small form factor computing device of claim 8, wherein the property information is associated with a mode of the application, wherein the mode includes one of:

an immersive mode;

a toolbar mode;

an edit mode; and a palette mode.

11. The small form factor computing device of claim 8, wherein the items of the user interface display include one or more of:

an application title bar;

a system tray;

an application canvas;

a palette;

a collapsed hint state palette bar;

an onscreen keyboard;

a toolbar; and a system navigation region.

12. The small form factor computing device of claim 8, wherein the small form factor computing device is further caused to perform operations to:

determine the small form factor computing device is in a landscape orientation;

arrange a system tray along a first side edge of the display device, the system tray comprising one or more system-level status information items substantially in-line in a first column; and arrange a system navigation region along a second side edge of the display, the system navigation region comprising one or more operating system navigation commands substantially in-line in a second column.

13. The method of claim 1, wherein the application user interface display comprises a web-based application user interface display.

14. The small form factor computing device of claim 8, wherein the application user interface display comprises a web-based application user interface display.

* * * * *